United States Patent [19]
Aimoto et al.

[11] Patent Number: 5,936,955
[45] Date of Patent: *Aug. 10, 1999

[54] NETWORK FOR MUTUALLY CONNECTING COMPUTERS AND COMMUNICATING METHOD USING SUCH NETWORK

[75] Inventors: Takeshi Aimoto, Sagamihara; Hidenori Inouchi, Higashimurayama; Shoichi Murase, Yokohama; Shinichi Tanabe, Hadano; Kazuhiro Hashimoto, Hadano; Hiroshi Iwamoto, Hadano; Hiroshi Ohguro, Hadano; Takehisa Hayashi, Sagamihara, all of Japan; Haruyuki Nakayama, Washington, D.C.; Kenji Nakajima, Ebina, Japan; Satoshi Yoshizawa, Kawasaki, Japan; Hideki Murayama, Kunitachi, Japan

[73] Assignee: Hitachi, Ltd., Tokyo, Japan

[*] Notice: This patent is subject to a terminal disclaimer.

[21] Appl. No.: 08/964,712

[22] Filed: Nov. 5, 1997

Related U.S. Application Data

[63] Continuation of application No. 08/529,762, Sep. 18, 1995, Pat. No. 5,835,492, which is a continuation-in-part of application No. 08/297,220, Aug. 29, 1994, Pat. No. 5,617,424.

[30] Foreign Application Priority Data

| Sep. 8, 1993 | [JP] | Japan | ................................. 5-223550 |
| Sep. 20, 1994 | [JP] | Japan | ................................. 6-224502 |
| Sep. 20, 1994 | [JP] | Japan | ................................. 6-224503 |

[51] Int. Cl.$^6$ ........................................... H04J 3/24
[52] U.S. Cl. ........................................ 370/389; 370/382
[58] Field of Search ............................ 370/258, 351, 370/354, 382, 389, 360, 269, 349; 395/800.11, 800.28

[56] References Cited

U.S. PATENT DOCUMENTS 4,061,880  12/1977  Collins et al. ........................... 370/382

(List continued on next page.)

FOREIGN PATENT DOCUMENTS 2123199  5/1993  Canada ........................... H04L 9/14

(List continued on next page.)

OTHER PUBLICATIONS

J. Gait, "A Kernal for High–Performance Multicast Communications," IEEE Transactions on Computers, vol. 38, No. 2, Feb. 1989.

(List continued on next page.)

Primary Examiner—Douglas W. Olms
Assistant Examiner—Shick Hom
Attorney, Agent, or Firm—Fay, Sharpe, Beall, Fagan, Minnich & McKee

[57] ABSTRACT

A data communication system for a computer system in which a plurality of computers are mutually connected includes: a plurality of computers each having an area to store a command to execute a data communication on the basis of it and a buffer area to store data; a switch circuit to mutually selectively connect the plurality of computers; and a transmission permitting component, connected between the switch circuit and one of the plurality of computers, for outputting a signal to permit the data transmission from such one computer to such another computer; a communication component for transmitting the data received from such one computer by outputting the transmission permission signal from the transmission permitting component to such another computer through the switch circuit; a detecting component to detect the occurrence of an abnormality regarding the data communication from such one computer to such another computer; and a communication control component to abandon the data that is subsequently received from such one computer by outputting the transmission permission signal in accordance with an output of the detecting component. When the abnormality occurs, the switch circuit releases such another computer, thereby disconnecting such one computer and such another computer. When reception commands prepared in the buffer area of such another computer are perfectly used, such another computer abandons the packet which does not include the flag to instruct the continuous reception.

10 Claims, 18 Drawing Sheets

U.S. PATENT DOCUMENTS

| | | | |
|---|---|---|---|
| 4,654,654 | 3/1987 | Butler et al. | 340/825.3 |
| 4,814,973 | 3/1989 | Hillis | 395/800.16 |
| 5,084,870 | 1/1992 | Hutchison et al. | 370/258 |
| 5,210,749 | 5/1993 | Firoozmand | 370/85.1 |
| 5,276,895 | 1/1994 | Grondalski | 395/800 |
| 5,317,565 | 5/1994 | Crouse et al. | 370/354 |
| 5,414,717 | 5/1995 | Matsumoto et al. | 370/432 |
| 5,504,865 | 4/1996 | Mabuchi | 395/200.67 |
| 5,506,965 | 4/1996 | Naoe | 370/296 |
| 5,559,804 | 9/1996 | Amada et al. | 370/349 |
| 5,617,424 | 4/1997 | Murayama et al. | 370/389 |

FOREIGN PATENT DOCUMENTS

| | | | |
|---|---|---|---|
| 3-29048 | 2/1991 | Japan | G06F 15/16 |
| 4-18652 | 1/1992 | Japan | G06F 13/00 |

OTHER PUBLICATIONS

"VAX Clusters: A Closely–Coupled Distributed System", ACM Transaction on Computer Systems, vol. 4, No. 2, May 1986, pp. 130–146.

Digital Technical Journal, VAX Cluster Systems, No. 5, Sep. 1987.

Digital Technical Journal, Availability in VAX Cluster Systems, Network Performance and Adapters, vol. 3, No. 3, Summer 1991.

"Hamlyn—an Interface for Sender–Based Commumications", Hewlett–Packard Laboratories Operating Systems Research Department, Nov. 30, 1992.

Internetting with TCP/IP vol. II, Chapter 2, The Structure of TCP/IP Software in An Operating System, Prentice–Hall International Editors, D.E. Comer, pp. 7–24, 1991.

"Designing High Performance Communication Mechanism for Multi Computer Systems", H. Murayama et al.

FIG. 5

(START OF TRANSMITTING OPERATION)

510 — DMA CONTROL UNIT 120 READS OUT CONTENTS IN TRANSMISSION COMMAND AREA 161 ON THE BASIS OF INFORMATION IN TRANSMISSION COMMAND CONTROL INFORMATION HOLDING MEANS 111

520 — DMA CONTROL UNIT 120 EXTRACTS TYPE 320-a, SOURCE ADDRESS 321-a, AND DESTINATION ADDRESS 322-a FROM CONTENTS IN TRANSMISSION DMA CONTROL INFORMATION HOLDING MEANS 116

530 — DMA CONTROL UNIT 120 READS USER DATA T172. INTO BUFFER 121 FOR TRANSMISSION ON THE BASIS OF TRANSMISSION DMA CONTROL INFORMATION HOLDING MEANS 116

540 — DMA CONTROL UNIT 120 FORMS TRANSMISSION PACKET INTO BUFFER 121 FOR TRANSMISSION FROM TYPE 320-a, SOURCE ADDRESS 321-a, DESTINATION ADDRESS 322-a, AND CONTENTS OF USER DATA T172

550 — NETWORK TRANSMISSION/RECEPTION UNIT 118 OUTPUTS NETWORK PACKET CONSTRUCTED IN BUFFER 121 FOR TRANSMISSION TO NETWORK 190 EVERY CELL

560 — TRANSMISSION CELL IS LAST CELL OF TRANSMISSION PACKET?
 — NO → (back to 530)
 — YES ↓

570 — WRITE TRANSMISSION DMA END STATE INTO TRANSMISSION COMMAND AREA 161. UPDATE INFORMATION IN TRANSMISSION COMMAND CONTROL INFORMATION HOLDING MEANS 111

580 — TRANSMISSION COMMAND REGARDING PACKET THAT IS NOT YET TRANSMITTED EXISTS?
 — YES → (back to 510)
 — NO ↓

(END OF TRANSMITTING OPERATION)

NETWORK FOR MUTUALLY CONNECTING COMPUTERS AND COMMUNICATING METHOD USING SUCH NETWORK

This is a continuation application of U.S. Ser. No. 08/529,762, filed Sep. 18, 1995, now U.S. Pat. No. 5,835,422, which is a CIP application of U.S. Ser. No. 08/297,220 filed Aug. 29, 1994 now U.S. Pat. No 5,617,424.

BACKGROUND OF THE INVENTION

The present invention relates to a data processing system such as parallel computer system, distributed processing network, or the like in which two or more computer systems are connected through a mutual connection network, thereby enabling parallel processings and distributed processings.

A packet transfer is disclosed in D. E. Comer, et al., "INTERNETWORKING WITH TCP/IP VOLUME II, Chapter 2, The Structure of TCP/IP Software In An Operating System", Prentice-Hall International Editors, pp. 7–24, 1991.

In the parallel computer system, one application for parallel processings previously divides processings into a plurality of nodes of parallel computers and each processing is executed in parallel and, by performing an inter-node communication at a node between the processings, the whole processings are cooperatively executed.

As a conventional technique of a mutual connection network among computers for performing parallel processings, for example, there are "Virtual Cut-Through: A New Computer Communication Switching Technique", Computer Network 3 (1979), pp 267–286, North-Holland Publishing Company, and "Parallel Processor" of JP-A-60-84661 (U.S. Pat. No. 4,814,973). According to those techniques, a message- or packet-transfer circuit in a processing element (hereinafter, referred to as a PE) of a parallel computer transmits an inter-processor packet constructed by an address and data in an order of an address portion first and, subsequently, a data portion. A packet communication network for switching a path for packets is constructed by one or a plurality of packet path change-over switches and sets a communication path at a time when the address portion is received. Each packet path change-over switch releases the communication path at a time point when the transmission of all packets is completed. Such a communication system is also called a Wormhole communication. Generally, a communication path of the mutual connection network for the parallel computers includes such a packet transfer circuit and such packet path change-over switches. Each packet is separated to units of a small capacity called flits or cells and transferred. In the case where the packet path change-over switch on the reception side or a reception cell buffer of a small capacity which the PE has is in a busy state, in order to prevent that the reception cell or packet is abandoned, the transmission is waited by a hardware flow control for turning off a transmission permission signal of the cell to be sent to the transmission side for a period of time until it can be received.

As mentioned above, in the case where it is guaranteed between PEs in the parallel computer system to receive each cell in a predetermined time by setting a granularity of each partial process that is received to a proper value to execute predetermined tasks, even if there is no large capacity buffer to store all of the packets, a reliable communication of a high throughput and a low latency can be cheaply realized by adding a communication buffer to the communication path in the parallel computers and by hardware flow controlling them.

As another conventional technique, a communication on an LAN (Local Area Network) such as Ethernet, FDDI, or the like will now be described.

In each of the computers connected to the LAN, a number of various distributed application softwares which are not predetermined are running. The hardware flow control function does not exist in the communication on the LAN. Therefore, when much data from many PEs are sent to a specific computer, processing capabilities of the packet transfer circuit and communication software will be lacking and a computer system on the reception side abandons the packet. For the packet abandoned by the computer system on the reception side, another packet will be retransmitted by using a transmission acknowledging function and a retransmitting function by the communication software.

In the LAN, there are the following requirements different from those of the mutual connection network for parallel processings.

(a) There is no flow control function providing decreased throughput for succeeding packets between the transmission side and reception side.

(b) The whole LAN is not stopped by a fault or state in a computer connected to the LAN.

In recent years, there is a high performance parallel computer system wherein a plurality of high quality computers of similar capabilities are connected by a high speed switching network through a high speed communication path over a distance of up to 100 m ("Clusters STAY UP and GROW HUGE", DATAMATION, pp. 39–45, September, 1994). Such a system is called a cluster system and can realize a performance similar to that of the conventional parallel computers. Although the cluster system is used as one parallel computer system in the ordinary operation, it is considered that in the other cases, the cluster system is effectively used as a network (of the LAN type) which a number of unspecified users (application programs) individually use (hereinafter, such a use is called a network for distributed processings).

As mentioned above, however, the network for distributed processings such as an LAN or the like has a feature different from that of the mutual connection network of the parallel computers. When, therefore, the mutual connection network of the parallel computers is simply used as a part of the network for distributed processes, there are the following problems.

(a) Although the hardware flow control is effective for communications within the parallel processing system, it will deteriorate the throughput in communications within an LAN connected to a distributed processing system.

(b) With respect to the prevention of the spread of fault:

In case of a fault in one of computers for distributed processings, it is necessary to prevent the fault from spreading over the other computers connected to the LAN. Then, it will be desirable to retransmit data to/from the one computer after the normal operation is recovered rather than to stop the whole system until its recovery. On the other hand, in case of a fault in one of parallel processing computers, for example, a hang-up of the packet transfer circuit, when the hardware flow control functions, the packet is stopped on the packet transfer circuit or packet transfer network, so that the transmission side also enters a transmission stop state and the communication path from the computer on the transmission side to the computer that cannot receive is blocked. Further, another computer having the transmission packet to such an unreceivable computer also enters a waiting state of the communication path and, a problem such that the whole cluster system finally stops occurs. As mentioned above, in the case in which the packets are received in a predetermined time as a system is not guaranteed, if the hardware flow control operates, a problem such that the whole cluster system finally stops occurs.

As a prerequisite of the above circumstances, one communication path is assumed because normally one application program is executed in one time. When a plurality of paths can be logically constructed, although the whole cluster system does not always stop, a problem that throughput over stopped paths deteriorates remains.

Factors deteriorating the data reception in a predetermined time through the communication path blocked because of the hardware flow control not guaranteed are explained below.

(a) Lack of supplying capability of reception buffer by communication software of computer on the reception side.

In the case where there is no remaining reception buffer of the computer on the reception side, there is a possibility that the network adapter's receiving operation stops for a period of time until the activation of the communication software of the computer on the reception side and, during the period the whole cluster system stops.

(b) The packet transfer adapter of the computer on the reception side is not in operation, deteriorating operation of the communication network connected to the computer (including incompletion of the recovery process after the fault occurred).

(c) Hardware fault of the packet transfer circuit on the transmission side after the circuit connected a path.

(d) Hardware fault of the packet transfer circuit on the reception side.

(e) Disconnection of the computers on the transmission side from the network under a state of holding a path.

(f) Disconnection of the computers on the reception side from the network before reception.

SUMMARY OF THE INVENTION

It is an object of the invention to realize a mutual connection network which has a hardware flow control that can be applied to parallel processings and can be also used for distributed processings.

Another object of the invention is to decrease a software overhead for interruption and switching of data transfer among computers in a multiprocessor system, enhancing effective processings.

Another object of the invention is to cheaply provide a mutual connection network having block releasing means of a communication path in which the operation can be switched on the basis of a designation of the user in accordance with an operating state (mutual connection network is operated integratedly or divisionally) of the network or a detecting state of the blocking in a manner such that when the network is used as a mutual connection network for parallel processes, since both of a hardware and a software are under the management of one user, even when the software is in an unreceivable state, the computers on the transmission side and reception side don't abandon the packets, and when the network is used as a network for distributed processes, the computers on the transmission side and reception side abandon the packets so long as the software and hardware are in the unreceivable state.

Still another object of the invention is to cheaply provide parallel computers in which a communication program on the transmission side instructs a packet having information regarding a communication program on the reception side to be activated in a packet header and the reception side has a mechanism to switch and activate the communication program on the basis of the above instruction information.

Further another object of the invention is that in a computer system constructed by a plurality of computers connected by a network, a software overhead in association with an interruption and a switching are reduced, thereby improving a processing efficiency of the system.

Further another object of the invention is that in a computer system constructed by a plurality of computers connected by a network, there is realized a mutual connection network which reduces an overhead of a software to execute processes for selecting and rearranging packets corresponding to the computers on the reception side which mixedly received communication data separated to a plurality of communication packets from the plurality of computers, respectively.

A data communication system for a computer system in which a plurality of computers are mutually connected according to the present invention includes:

a plurality of computers each having an area to store a command to execute a data communication on the basis of it and a buffer area to store data;

a switching circuit to mutually selectively connect the plurality of computers;

transmission permitting means, connected between the switching circuit and one of the plurality of computers, for outputting a signal to permit the transmission of the data from such one computer to such another computer;

communicating means for transmitting the data received from such one computer by outputting the transmission permission signal from the transmission permitting means to another computer through the switching circuit;

detecting means for detecting the occurrence of an abnormality regarding the data communication from such one computer to such another computer; and communication control means for abandoning the data to be received subsequently from such one computer by outputting the transmission permission signal in accordance with an output of the detecting means.

When the abnormality occurs, the switching circuit releases such another computer, thereby disconnecting such one computer from such another computer.

The detecting means detects the abnormality when either one of the command storage area or the data storage buffer area enters a preparation insufficient state because of the data communication or detects the abnormality when a signal to request the connection from either such one computer or such another computer is not received.

It is possible to provide means for setting a flag instructing a continuous reception of packets.

It is also possible to provide means for abandoning the packets that does not include said flag instructing the continuous reception when reception commands prepared in the buffer area of such another computer are fully used.

Said one computer can have means for transmitting a packet to set a transmitting mode before the data transmission.

Said another computer can have register means for holding information indicating whether the reception data is abandoned in accordance with the output of the detecting means or not in accordance with the transmitting mode set packet.

According to further aspect, the data communication system of the invention can have:

means for setting an interruption signal flag indicating whether an interruption signal indicative of the end of the data communication should be generated after the reception of a data packet and transmitted from one computer or not and a continuous reception flag indicating whether the continuous data packets are continuously received or not into the data packet; and interrupting means for generating a data communication end interruption when the interruption signal flag has been set in the data packet received by another computer.

It is possible to provide means for setting the interruption signal flag indicating that the interruption signal representing the end of the data communication should be generated after the reception of the last data packet into the last one of a series of data packets which are transmitted from one computer and for setting the continuous reception flag indicating that the continuous reception should be performed into the continuous data packets before last data packet.

According to a more detailed aspect, for the factor (a), instruction information to decide whether the packet is abandoned or not in accordance with that the computer on the reception side is in the unreceivable state is provided in the packet. A packet transfer adapter of the computer on the reception side can have a hardware mechanism for judging whether the packet is abandoned or not in a state in which a reception area in the memory is in a state of a lack of reception buffer or an overflow on the basis of such instruction information.

Instruction information to decide whether the packet is abandoned in a state in which the computer on the reception side is in the unreceivable state or not is provided in a mode register/command register of the computer on the reception side. The computer on the reception side can have a hardware mechanism for judging whether the packet is abandoned or not on the basis of such instruction information when the unreceivable state is detected.

By those functions, when the distributed processing packets are transferred, an instruction to abandon the packet in the state of the lack of reception buffer or overflow of the reception area in the memory is set into the instruction information in the packet. When the parallel processing packets are transferred, such an instruction is not set. When the distributed processes are executed, an instruction to abandon the packet in the state of the lack of reception buffer or overflow of the reception area in the memory is set into the mode register/command register. When the parallel processes are executed, such an instruction is not set.

For the factor (b), according to the invention, in the unreceivable state, it is desirable to abandon the packet irrespective of the instruction information in the mode register/command register and the instruction information in the packet.

For the factors (c) and (d), a progressing situation of a transmitting command and a progressing situation of a receiving command are monitored by timers. When an abnormality is detected, the packet transfer adapter is reset irrespective of the execution of the distributed processes or the parallel processes and a connecting state signal of a packet transfer signal line between computers is turned off. Thus, an interface circuit of a network apparatus releases a blocked communication path.

Specifically speaking, for the blocking of the signal line on the transmission side, the interface circuit of the network apparatus transfers a packet transfer abnormal end notification signal to the reception side and, further, releases a transmission side connection of the switch in the packet communication network. Thus, the computer on the reception side can recognize early the abnormal end of the transfer without waiting for the next packet reception. The switch is released for a packet transmission request from another computer.

For the blocking of the reception side signal line, a transmission permission signal of the reception side communication path from the switch of an inter-PE transmitting and receiving circuit in the packet communication network is fixed to on. Thus, even when there are the reception packets, all of them are abandoned by the inter-PE transmitting and receiving circuit and the blocking of the communication path doesn't occur. In order to cope with an unexpected disconnection of the transmission permission signal line, it is desirable to set a 0V signal level to the transmission permission signal.

For the factors (e) and (f), since a connection state signal of an inter-PE packet transfer signal line is off, the communication path is released as mentioned above.

According to the invention, in the unreceivable state, the computer system on the reception side can instruct whether the packet is received or abandoned in accordance with an instruction by a control field or a mode register of the transmission packet. It is possible to cheaply realize a high speed mutual connection network such that a message transfer circuit of the computer system on the reception side can switch the receiving or abandoning operation on the basis of the instruction.

To accomplish the above objects, according to the invention, it is possible to provide the following reception notification flag area, reception notification flag area setting means, reception notification judging means, and reception program status flag area.

The reception notification flag area is set at the time of the packet transmission by reception notification flag area setting means provided for the transmission side computer. Whether it is necessary to issue a reception notification upon packet reception to the computer on the reception side or not is designated.

With reference to the reception notification flag area of the packet received by the reception notification judging means, the reception side computer judges whether the reception notification is issued or not on the basis of a value of the reception notification flag area. The reception notification is issued as necessary.

A reception program status flag area is also provided. Whether the reception program is in the reception waiting state or not is stored as a status. Thus, the reception notification judging means issues the reception notification only when the reception program is in the reception waiting state.

Further, in the reception notification flag area setting means, by providing means for deciding whether the reception notification flag area is set or not in accordance with the number of transmission data, transmission data accumulated length, or elapsed time, a mode to issue the reception notification on the reception side computer only every plural communication data is designated.

According to still another aspect of the invention, it is possible to provide the following continuous reception instruction flag area, continuous reception instruction flag area setting means, continuous reception instruction embodying means, and reception buffer state judging means.

The continuous reception instruction flag area is set upon transmission of the packet by the continuous reception instruction flag area setting means provided for the transmission side computer. Whether the transfer path is released to another transmitting side (source) at a node of the packet transfer or not is instructed to the continuous reception instruction embodying means of the mutual connection network.

With reference to the continuous reception instruction flag area of the packet received by the reception buffer state judging means, the reception side computer judges whether the reception packet is abandoned in the lack state of the reception buffer or not on the basis of a value of such a flag area.

Further, in the continuous reception instruction flag area setting means, by providing means for deciding whether the continuous reception instruction flag area is set or not in accordance with the number of transmission data, transmission data accumulated length, or elapsed time, a mode to issue the reception notification by the reception side computer only every plural communication data is designated.

In accordance with a size of transmission message, when the size of message exceeds a packet size, a communication software of the computer on the transmission side designates continuous reception instruction information to a control flag of the transmission packet. On the basis of the continuous reception instruction information, a mutual connection network adapter in the transmission side computer adds continuous reception instruction information into packet header information and transmits the resultant information. In accordance with the designation of the control flag of the transmission packet, the mutual connection network judges whether the packet transfer path is disconnected and is released for the packet from the other computer at a node of the packet transfer or the packet transfer path from the same source is assured without releasing. When the continuous reception instruction flag is designated, the packet is not abandoned and the mutual connection network has the flow control function. Therefore, in cases other than the occurrence of a fault, it is guaranteed to sequentially receive the packets in accordance with the order at which the packets were transmitted from the transmission side. The computer on the reception side can receive a message exceeding the packet length from the same source as continuous packets. Thus, in the communication software, a process for rearranging the order is not activated.

BRIEF DESCRIPTION OF THE DRAWINGS

FIG. 5 is a flowchart showing a network adapter transmitting process;

DETAILED DESCRIPTION OF THE PREFERRED EMBODIMENTS

Figure 1:
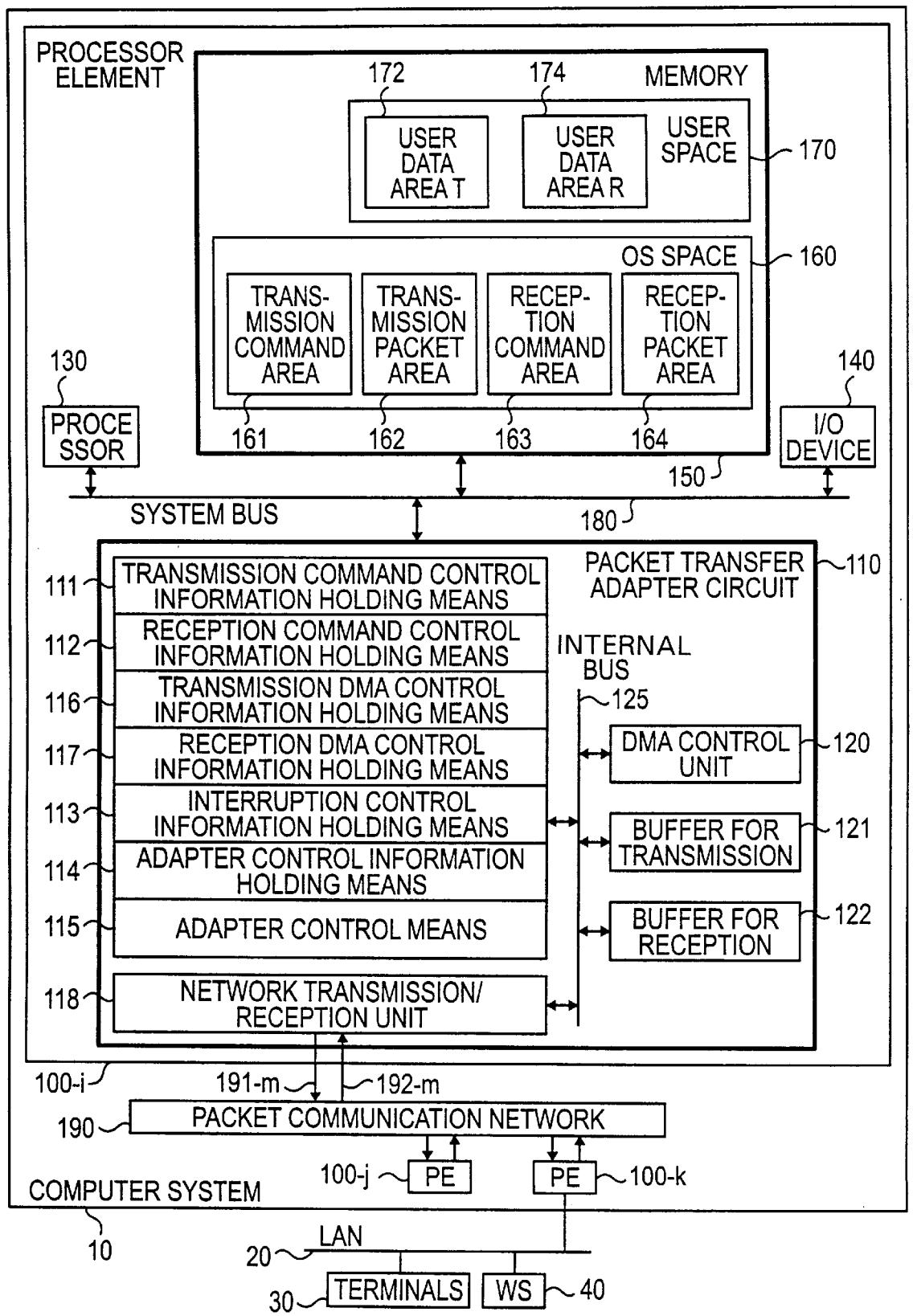
FIG. 1 is a whole constructional diagram of a parallel computer system of the invention.

A construction of a computer system 10 is shown in FIG. 1.

The computer system 10 is connected to work-stations 40 and terminals 30 through an LAN 20.

The computer system 10 is constructed by connecting two or more processing elements (PEs) 100-$i$, 100-$j$, and 100-$k$ to a packet communication network 190. The PE 100-$i$ is connected to the packet communication network 190 by a packet transfer signal line 191-$m$ from the PE 100-$i$ and a packet transfer signal line 192-$m$ to/from the PE 100-$i$. In the embodiment, the PEs 100-$i$, 100-$j$, and 100-$k$ and the packet communication network 190 are different apparatuses and are installed in independent casings. However, even when they are installed in the same casing, there is no problem.

A construction of the PE 100-$i$ will now be described hereinbelow. The PE 100-$i$ is constructed by connecting a processor 130, a memory 150, and a network adapter 110 to a system bus 180 as a minimum construction. In dependence on the system construction, the PE 100-$i$ has one or more I/O devices 140. The processor 130 is constructed by, for example, a CPU. The memory 150 is constructed by, for example, an RAM and is constructed by an operating system OS space 160 and a user space 170. A transmission command area 161, a transmission packet area 162, a reception command area 163, and a reception packet area 164 exist in the OS space 160. A user data area -T 172 and a user data area -R 174 exist in the user space 170.

The packet transfer adapter circuit 110 is constructed by connecting a DMA control unit 120, a buffer 121 for transmission, a buffer 122 for reception, a network transmission/reception unit 118, transmission command control information holding means 111, reception command control information holding means 112, interruption control information holding means 113, adapter control information holding means 114, adapter control means 115, transmission DMA control information holding means 116, and reception DMA control information holding means 117 by an internal bus 125. The transmission command control information holding means 111, reception command control information holding means 112, interruption control information holding means 113, adapter control information holding means 114, transmission DMA control information holding means 116, and reception DMA control information holding means 117 are means for holding necessary information when a transmission or reception packet is transferred and controlled by a DMA process and can be constructed by, for example, RAMs.

The adapter control information holding means 114 is means for setting an operating mode of the packet transfer adapter circuit 110 or the like. The adapter control information holding means 114 can also set operating mode information indicating whether a reception area in a memory is available or not or whether a packet is abandoned in an unreceivable state or not. Ordinarily, at the time of the execution of distributed processes, the software sets an instruction to abandon the packet in the unreceivable state which occurs because of the reception area in the memory. When parallel processes are executed, such an instruction is not set. The adapter control means 115 is means for allowing the processor 130 to notify a control when the transmission or reception packet is transferred and controlled by the DMA process to the packet transfer adapter circuit 110 and can be constructed by, for example, a logic such as TTL, CMOS, or the like. The DMA control unit 120 and network transmission/reception unit 118 can be constructed by a logic such as TTL, CMOS, or the like. The buffer 121 for transmission and buffer 122 for reception can be constructed by, for example, RAMs. The reception command control information holding means 112 designates a group of reception commands in the reception command area by a head pointer and a tail pointer, thereby instructing the receiving operation to a hardware circuit. The hardware circuit sets a flag bit corresponding to the pointer to "0" and also updates the pointer each time the receiving operation is progressed. The flag represents presence of received data in the command area. The communication software refers to the flag to ascertain whether the hardware completed the receiving operation so as to copy the data in the reception packet area 164 to the user data area 174. The software will thereafter designates reception commands, set flag bits, updates head pointers for succeeding receiving operations, and inform the hardware of the added reception command area. Thus, the hardware and the software cooperate to execute the communication effectively. When the receiving operation of the software is delayed, a command vacant area becomes insufficient.

Figure 2:
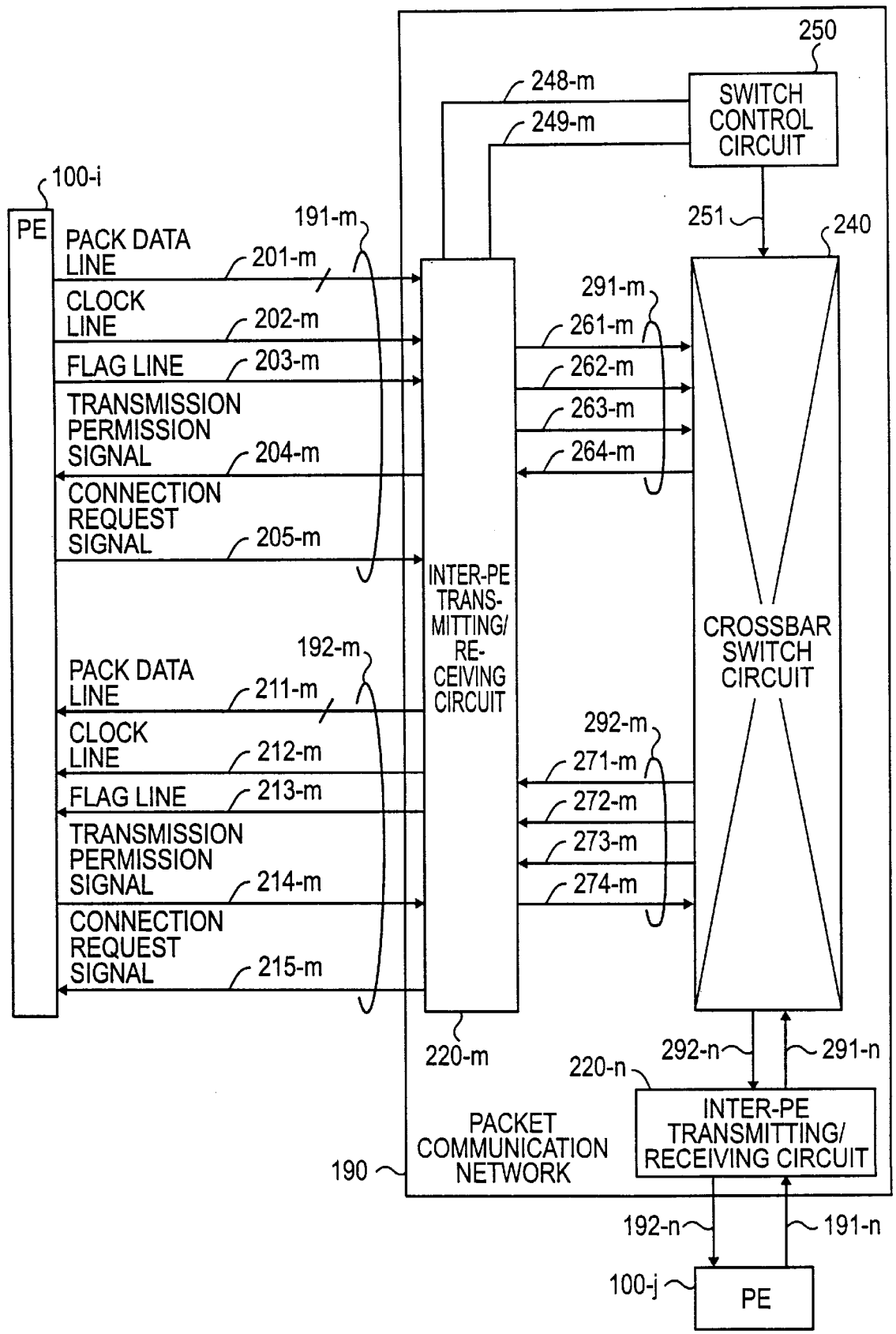
FIG. 2 is a constructional diagram of an inter-PE packet transfer signal line.

The packet transfer signal line and a construction of the packet communication network are shown in FIG. 2.

The packet communication network 190 is constructed by inter-PE transmitting/receiving circuits 220-$m$ and 220-$n$, a crossbar switch circuit 240, and a switch control circuit 250. A switch connection request signal 248-$m$ is a connection request signal of the crossbar switch circuit 240. A switch connection response signal 249-$m$ is a response signal to the switch connection request signal 248-$m$. A packet communication path is switched on the basis of an instruction from the switch control circuit 250. The inter-PE transmitting/ receiving circuit 220-$m$ is an interface circuit between the PE 100-$i$ and the packet communication network 190 and executes transmission and reception between the PE 100-$i$ and the crossbar switch circuit 240. Packet transfer signal lines 191-$m$ and 291-$m$ are signal lines to transfer the packet from the PE 100-$i$ to the crossbar switch circuit 240. Packet transfer signal lines 292-$m$ and 192-$m$ are signal lines to transfer the packet from the crossbar switch circuit 240 to the PE 100-$i$. Packet transfer signal lines 291-$n$ and 191-$n$ are signal lines to transfer the packet from the PE 100-$j$ to the crossbar switch circuit 240. Packet transfer signal lines 192-$n$ and 292-$n$ are signal lines to transfer the packet from the crossbar switch circuit 240 to the PE 100-$j$.

The packet transfer signal line 191-$m$ is constructed by a packet data line 201-$m$ to transfer packet data, a flag line 202-$m$ indicating that the data on the packet data line 201-$m$ is a head of the packet, a clock line 203-$m$ to transfer timing information, a transmission permission signal 204-$m$ to notify that the packet communication network 190 can receive the packet, and a connection request signal 205-$m$ indicative of a connection request from the PE 100-$i$. The packet transfer signal line 291-$m$ is constructed by a packet data line 261-$m$, a flag line 262-$m$, a clock line 263-$m$, and a transmission permission signal 264-$m$. The packet transfer signal line 192-$m$ is constructed by a packet data line 211-$m$, a flag line 212-$m$, a clock line 213-$m$, a transmission permission signal 214-$m$ to notify that the PE 100-$i$ can receive the packet, and a connection request signal 215-$m$ indicative of a connection request from the packet communication network 190. The packet transfer signal line 292-$m$ is constructed by a packet data line 271-$m$, a flag line 272-$m$, a clock line 273-$m$, and a transmission permission signal 274-$m$. Since the packet transfer signal lines 291-$m$ and 292-$m$ are installed in the same casing, the connection request signal is unnecessary. The construction of the packet transfer signal lines 191-$m$ and 192-$m$ and the like shows logical signal lines and they are not necessarily constructed by different signal lines.

The PE 100-$i$ will now be mainly described. Since the PE 100-$i$ and packet communication network 190 are different apparatuses, only when power source of both of them are ON and cables (packet transfer signal lines 191-$m$ and 192-$m$) are connected, a communication can be performed. The connection request signals 205-$m$ and 215-$m$ are signals to notify that the PE 100-$i$ and inter-PE transmitting/ receiving circuit 220-$m$ are physically and electrically in a connecting state and that there is a connection establishment request of a communication path in both of them. The connection request signal 205-$m$ is turned on by supplying an instruction from the processor 130 to the adapter control means 115. The connection request signal 215-$m$ is turned on in case of a communication possible state in which the power source of the packet communication network 190 is ON and there is no fault. When a fact that both of the connection request signals 205-$m$ and 215-$m$ are ON (connection establishment state) is detected, the network transmission/reception unit 118 and inter-PE transmitting/ receiving circuit 220-$m$ activate the packet transfer signal lines 191-$m$ and 192-$m$. The connection request signal 205-$m$ is turned off by supplying a disconnection instruction from the processor 130 to the adapter control means 115. When a fact that both signals 205-$m$ and 215-$m$ are not ON (connection disconnecting state) is detected, the network transmission/reception unit 118 and inter-PE transmitting/ receiving circuit 220-$m$ inactivates the packet transfer signal lines 191-$m$ and 192-$m$. By reading the states of the connection request signals 205-$m$ and 215-$m$ by the processor 130 through the adapter control means 115, the communication software recognizes the state of the connection.

The transmission permission signal 204-$m$ is a signal for flow control to notify that the reception buffer in the inter-PE transmitting/receiving circuit 220-$m$ can be received. The flow control is performed on a cell unit basis. The "cell" is a data unit when the packet is separated between the PEs and transferred. The transmission permission signal 204-$m$ performs the flow control of an individual path instead of the whole path between the PEs. In this case, paths from the memory 150 in the PE 100-$i$ on the transmission side to the packet communication network 190 are sequentially assured during the packet transfer and when the path of the crossbar switch circuit 240 in the packet communication network 190 becomes empty, a path from the inter-PE transmitting/ receiving circuit 220-$m$ to the inter-PE transmitting/ receiving circuit 220-$n$ is immediately assured and the paths from the packet communication network 190 to the memory 150 (FIG. 1) in the PE 100-*j* on the reception side are sequentially assured. The cells of the same packet exist in those paths and, after completion of the transmission, the paths are sequentially released.

When the cables including the packet transfer signal lines 191-*m* and 192-*m* enter the connection disconnection state during the communication of the PEs 100-*i* and 100-*j*, the inter-PE transmitting/receiving circuit 220-*m* executes the following operations in order to prevent the blocking of the paths.

Paths on the Reception Side

The operation of the inter-PE transmitting/receiving circuit 220-*m* connected between the packet transfer signal lines 292-*m* and 192-*m* will now be described. The transmission permission signal 274-*m* of the transfer signal line 292-*m* is fixed to ON. The crossbar switch circuit 240 transfers the reception cell to the inter-PE transmitting/receiving circuit 220-*m* in accordance with an instruction of the transmission permission signal 274-*m*. The inter-PE transmitting/receiving circuit 220-*m* abandons the reception cell from the packet transfer signal line 292-*m*. That is, the operation to transmit the reception cell is not performed.

Paths on the Transmission Side

When the packet is being transmitted from the signal line 191-*m* to the packet transfer signal line 291-*m* through the transmitting/receiving circuit 220-*m*, the packet communication network 190 assures a path of the crossbar switch circuit 240 by an instruction signal 251 from the switch control circuit 250 based on a request from the inter-PE transmitting/receiving circuit 220-*m*. When the above connection is disconnected, the inter-PE transmitting/receiving circuit 220-*m* issues a packet transfer abnormal end notification cell to the packet transfer signal line 261-*m*, thereby instructing a disconnection of the path of the crossbar switch circuit 240 to the switch control circuit 250. The PE on the packet reception side recognizes the disconnection of the path by a packet transfer abnormal end notification cell. When the packet is not being transmitted, a packet transfer abnormal end notification cell is not issued. When the packet transfer adapter 110 is not ready to start the communication software because of the state under error recovery or just after connection between the processor element PE and the packet communication network 190, received packets will be abandoned as explained below. Although the connection request signal 205-*m* is asserted, the mode register and the command registers are not yet ready. This state is informed from the adapter control means to the network transmission/reception unit 118, which asserts the transmission permission signal 214-*m*.

Figure 3A:
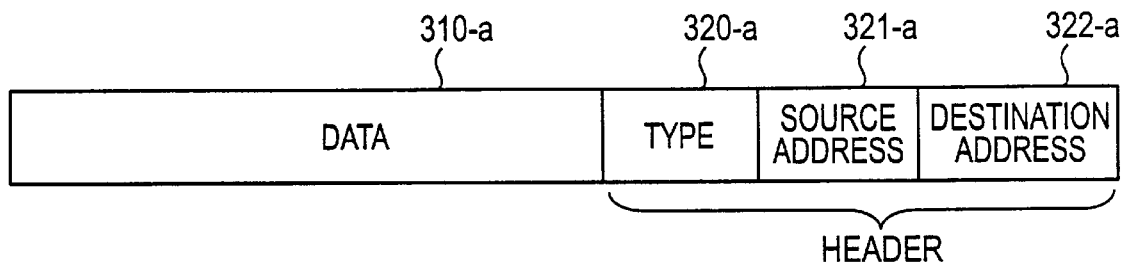
FIGS. 3A–3C are constructional diagrams of an inter-PE communication packet.

A construction of a network packet will now be described with reference to FIG. 3A. The network packet is constructed by data 310-*a*, a type 320-*a*, a transmitting side address (source address) 321-*a*, and a reception destination address (destination address) 322-*a*. The data 310-*a* is information that is processed by the OS and software. The type 320-*a* is information necessary for the packet transfer adapter circuit 110 to process and hold, for example, a length of whole packet data and the like. The source address 321-*a* is an identifier to identify a computer 200 in the network (intra-network computer 200) which transmitted the packet. The destination address 322-*a* is an identifier to identify the intra-network computer 200 that should receive the packet.

The details of the transmitting process and receiving process will now be explained hereinbelow.

The transmitting process is a process for making the network packet of the invention from the user data T 172 and transmission command information 161 and for outputting to the network. The software process upon transmission and the operation of the network adapter 110 will now be described hereinbelow.

The software process to execute a communicating process at the time of the transmitting process will now be described with reference to FIG. 4. User data as a target of transmission has been held in the user data T 172. First as shown in step 410, information as bases of the type 320-*a*, source address 321-*a*, and destination address 322-*a* is set into the transmission command information 161. The type 320-*a* is information such as an upper protocol kind or the like. The source address 321-*a* is the identifier in the network of the self computer. The destination address 322-*a* is the identifier in the network of the computer on the reception destination side.

As shown in step 420, information to designate the user data T 172 is set into the transmission command information 161. As information to be set, for example, there are an address of the user data T 172 in the user space 170, a data length, and the like.

As shown in step 430, the information in the transmission command information 161 is subsequently set into the transmission command control information holding means 111. As information to be set into the transmission command control information holding means 111, there are an address of the set transmission command information 161 in the OS space 160 and the like.

Finally, as shown in step 440, an activation of the operation is notified to the adapter control means 115. The transmission software process is executed by the above processes.

The operation of the network adapter 110 at the time of the transmitting process will now be described with reference to FIG. 5. The operation after the transmitting operation was started by the notification of the activation of the operation to the adapter control means 115 will now be explained.

First as shown in step 510, the DMA control unit 120 reads out the contents in the transmission command area 161 on the basis of the information in the transmission command control information holding means 111 and sets into the transmission DMA control information holding means 116.

Subsequently, as shown in step 520, the DMA control unit 120 extracts the type 320-*a*, source address 321-*a*, and destination address 322-*a* from the contents of the transmission DMA control information holding means 116.

As shown in step 530, the DMA control unit 120 reads the user data T 172 into the buffer 121 for transmission in accordance with the contents in the transmission DMA control information holding means 116.

As shown in step 540, the DMA control unit 120 sets the user data T 172 to the data 310-*a* and forms the network packet of the invention in the buffer 121 for transmission on a cell unit basis on the basis of the information (type 320-*a*, source address 321-*a*, destination address 322-*a*) in the transmission command area 161 that was read out.

Finally, as shown in step 550, the network packet is outputted on a cell unit basis from the network transmission/reception unit 118 through the internal bus 125.

As shown in step 560, when the final cell of the transmission packet is transmitted, the processing routine is branched to step 570. When the transmitted cell is not the final cell, the processing routine is branched to step 530.

After completion of the output of the network packet, a completion state of the packet transmission is written into the transmission command area 161. As shown in step 570, a packet transmission completion is reflected to the information in the transmission command control information holding means 111. The transmission software executes transmission post-processes on the basis of the completion state of the packet transmission written in the transmission command area 161.

Further, when there is a transmission command regarding the packet that is not yet transmitted, as shown in step 580, the processing routine is returned to step 510. When such a transmission command doesn't exist, the transmitting operation is finished.

Figure 6:
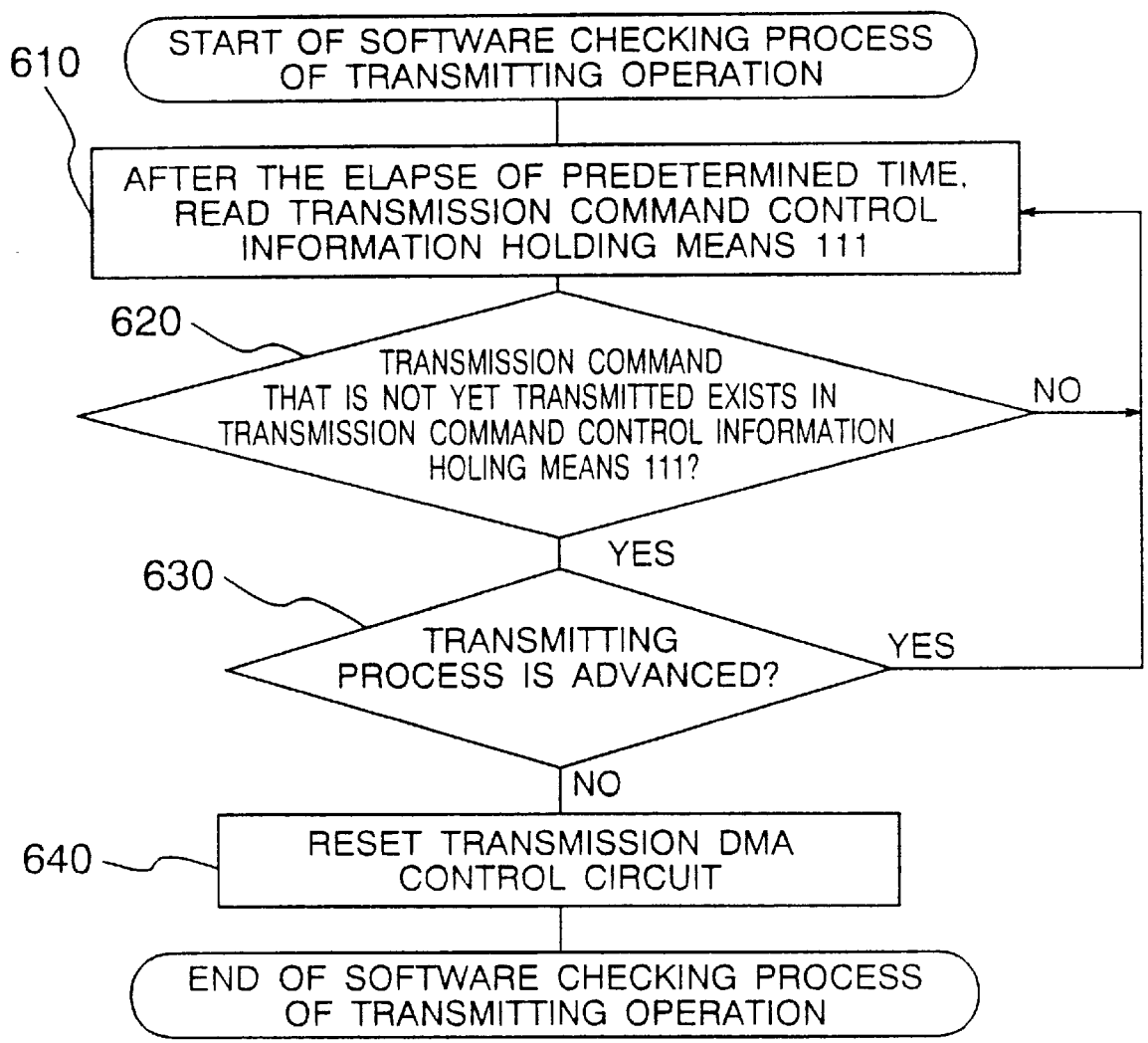
FIG. 6 is a flowchart showing a software checking process for a fault of a transmitting operation.

A software checking process of the transmitting operation will now be described with reference to FIG. 6.

The software checking process of the transmitting operation is executed by the processor 130 for a period of time from the completion of the transmitting software process to the next transmission software process.

Figure 4:
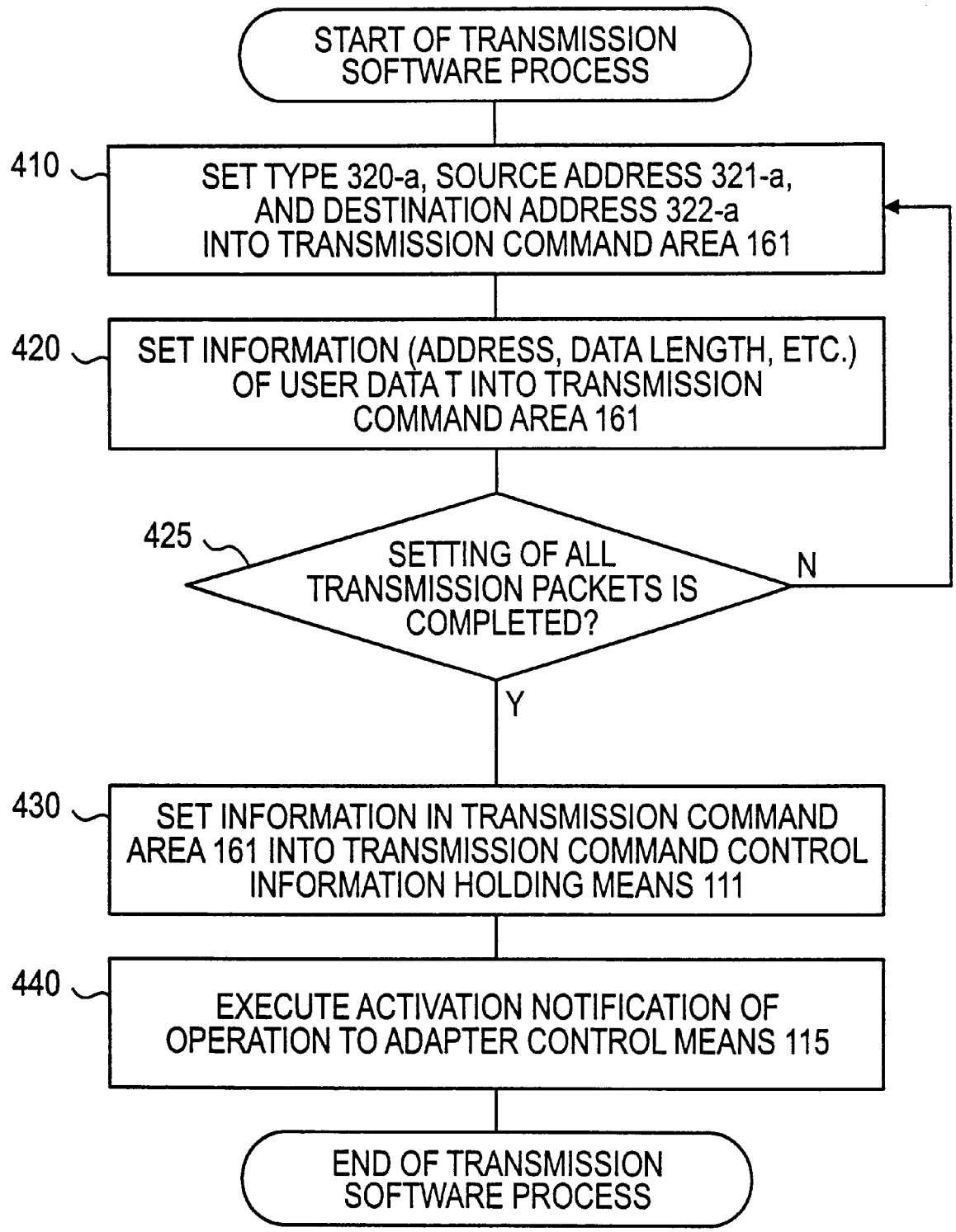
FIG. 4 is a flowchart showing a transmission software process.

First as shown in step 610, after the elapse of a certain time from the writing of the transmission command and the activation notification shown in FIG. 4, the contents in the transmission command control information holding means 111 are read out in order to check a progressing situation of the processes.

Subsequently, as shown in step 620, a check is made to see if a transmission command that is not yet transmitted exists in the transmission command control information holding means 111 or not. If YES, as shown in step 630, such an existing command is compared with the information in the transmission command control information holding means 111 that was read out at the preceding time. When they coincide, namely, when the transmitting process is not progressed, as shown in step 640, by supplying an instruction from the processor 130 to the adapter control means 115, the network adapter 110 is reset and the connection request signal 205-*m* is turned off. When it is turned off, the connection is disconnected and the packet transfer signal lines 191-*m* and 192-*m* are inactivated.

At the time of the occurrence of an abnormality of the packet transfer, when an instruction to issue a switch circuit release instruction cell is received to the adapter control means 115, the network adapter 110 on the transmission side issues a cell to notify that the packet transfer is finished because of the abnormality to the reception side from the network transmission/reception unit 118. The packet transfer abnormal end notification cell is transferred to the network adapter 110 of the destination PE via the packet communication network 190. The destination PE can recognize early the abnormal end of the packet transfer.

In the software checking process of the receiving operation, the packet to the self PE is set to the transmission command and after the elapse of a predetermined time from the writing of the transmission command, by confirming the reception, it is confirmed that the operation is normally being executed in a manner similar to the software checking process of the transmitting operation.

The receiving process will now be explained. In the ordinary receiving process, the network packet fetched from the network 190 is transferred to the user data area in the user space by the hardware process by the packet transfer adapter circuit 110 and the communication software in the OS space 160. Dependent on the state of the communication software or the like, the packet transfer adapter circuit 110 abandons the reception packet without activating the process of the communication software.

Figure 7:
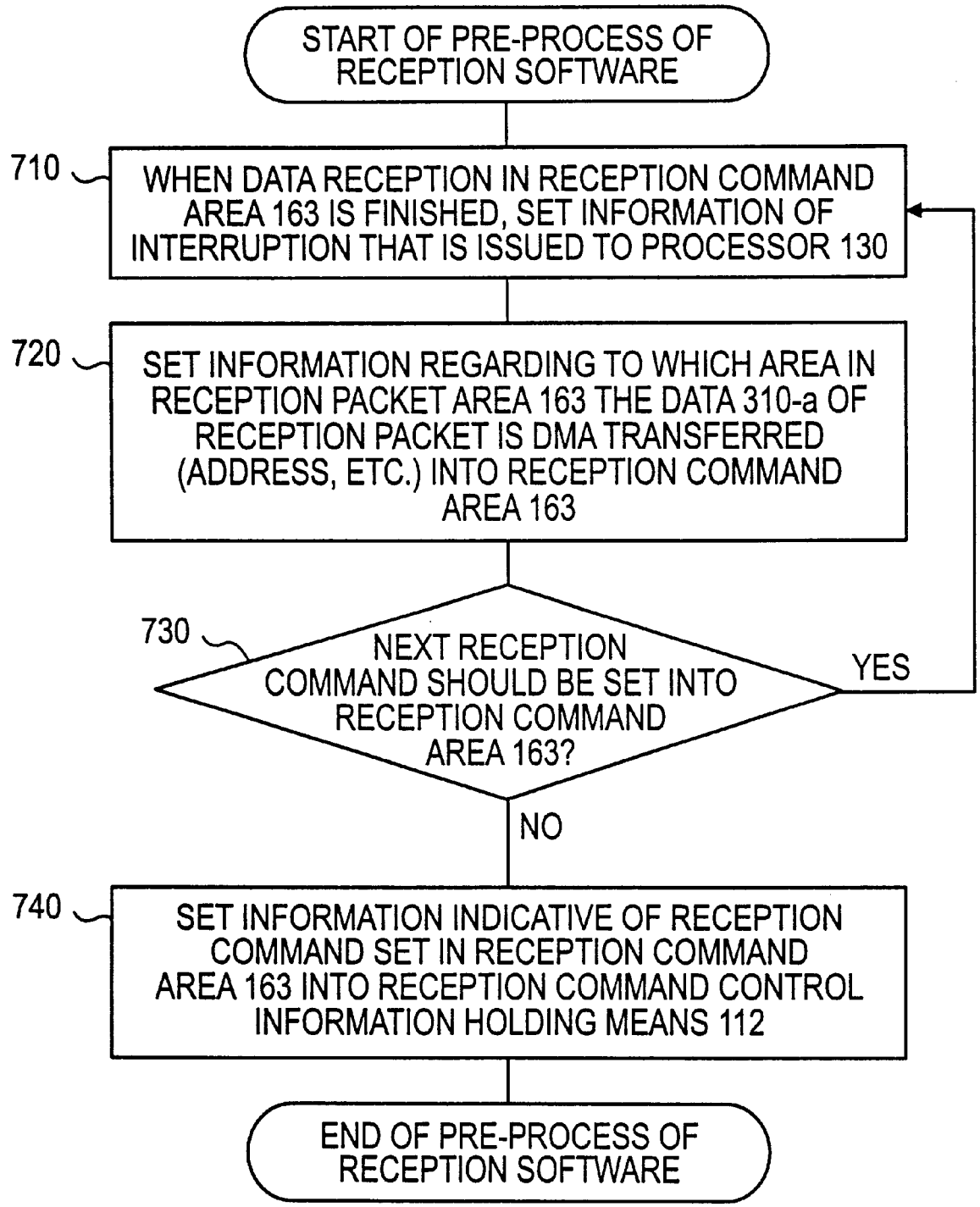
FIG. 7 is a flowchart showing a pre-process of a reception software.

The receiving process will now be explained hereinbelow. The receiving process is constructed by a pre-process for a reception software that is executed by the software prior to the arrival of data, a process that is executed by the network adapter 110 when data arrives, and a post-process for the reception software that is executed after the data arrived by the software. The pre-process of the reception software is shown in FIG. 7.

The reception software pre-process is a process for accumulating reception commands into the reception command area 163 in FIG. 1 and for notifying it to the network adapter 110.

First as shown in step 710, information of interruption which is issued to the processor 130 by the network adapter 110 at the end of the data reception is set into the reception command that is being set into the reception command area 163.

As shown in step 720, subsequently, information regarding whether the data 310-*a* of the received network packet is made correspond to which area in the reception packet area 164 is set into the reception command during preparation of the setting into the reception command area 163. As such information, there are an address of the transfer destination, a size, and the like of the data 310-*a* in the reception packet area 164.

As shown in step 730, in the case where there is the foregoing reception software post-processing command to be further set into the reception command area 163, step 710 is executed. When such a command doesn't exist, step 740 is executed. Finally as shown in step 740, information indicative of the reception command area 163 is set into the reception command control information holding means 112.

Figure 8:
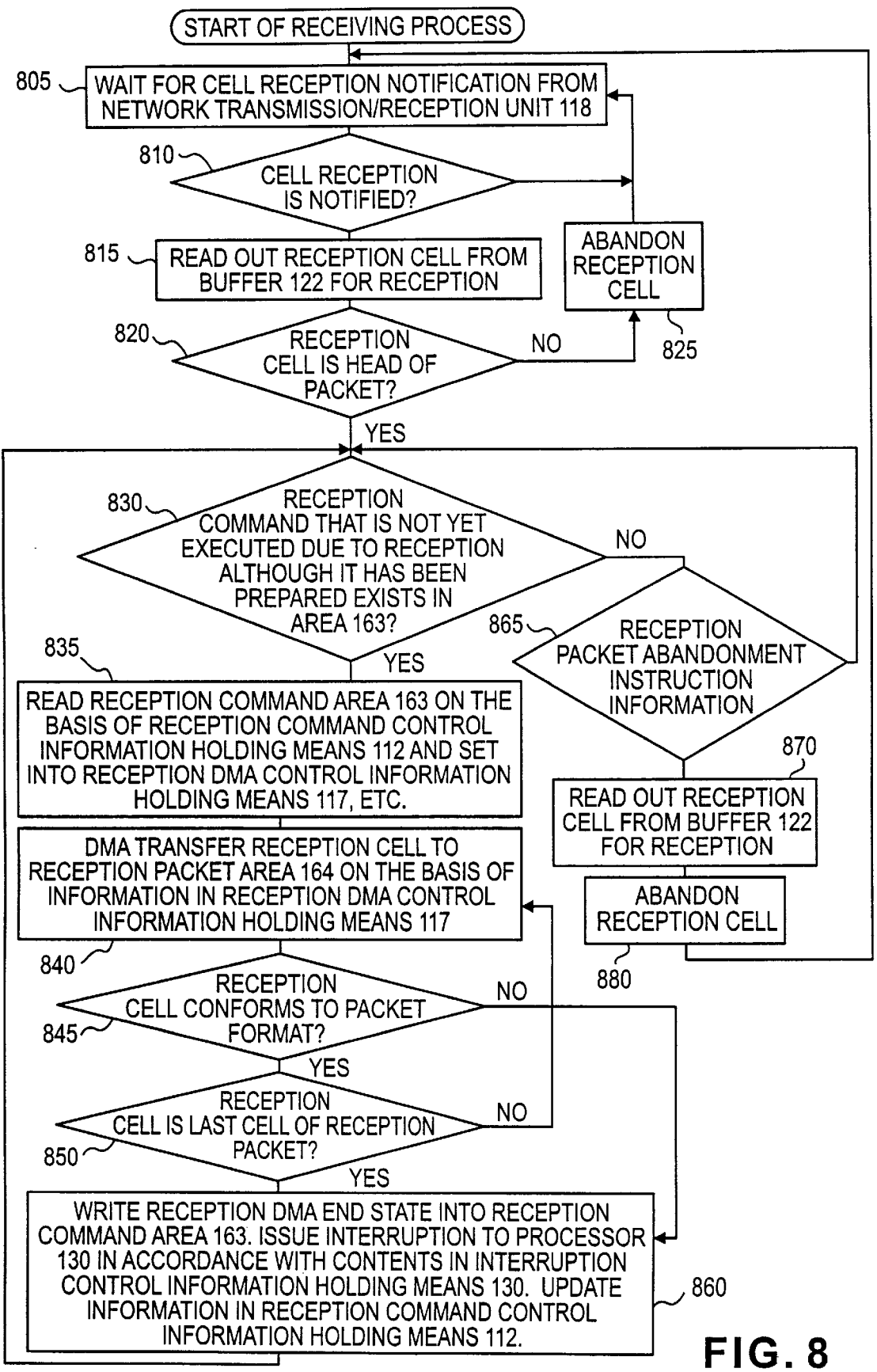
FIG. 8 is a flowchart showing a receiving operation of a network adapter DMA control unit.

The operation of the network adapter 110 until the reception packet data is received after the network packet was stored into the buffer 122 for reception is shown in FIG. 8. A flow after the start of the receiving operation that is executed by the notification of the activation of the operation to the adapter control means 115 is shown mainly with respect to the DMA control unit 120.

First, the network transmission/reception unit 118 in the network adapter 110 always functions so as to monitor the network 190 and to store the reception network packet into the buffer 122 for reception and, when it is stored, to notify to the DMA control unit 120. According to the embodiment of the invention, a switching type network suitable for the high speed packet transfer is shown as a packet communication network 190. According to another embodiment of the invention, the packet communication network 190 can also have topologies of the bus type and ring type. Even in this case as well, the hardware flow control can be executed.

As shown in step 805, the network adapter 110 waits for the notification of the cell reception from the network transmission/reception unit 118. When there is a notification of the cell reception in step 810, the processing routine is branched to step 815. When such a notification is not issued, the processing routine is branched to step 805. When there is a notification of the cell reception, the reception cell is read out from the buffer 122 for reception as shown in step 815. When the read-out reception cell is the head of the packet as shown in step 820, step 830 is executed. When it is not the head, step 825 is executed.

When the read-out reception cell is not the head, the reception cell in the buffer 122 for reception is abandoned as shown in step 825. This is because such a process is the receiving process of the packets such that in a state in which the PE 100-*i* and the packet communication network 190 are not yet connected, the remaining packets which were abandoned by the inter-PE transmitting/receiving circuit 220-*m* of the packet communication network 190 are received from the inter-PE transmitting/receiving circuit 220-*m* to the PE 100-$i$ just after the PE 100-$i$ and packet communication network 190 were connected. The cells are abandoned until the head cell of the packet is received.

In case of the head cell, as shown in step 830, on the basis of the information held in the reception command control information holding means 112, the DMA control unit 120 first judges whether the reception command that is not yet executed still remains in the reception command area 163 or not. If YES, step 835 is executed. If NO, step 865 is executed.

When such a command exists, as shown in step 835, on the basis of the information in the reception command control information holding means 112, the information of the reception command that is not yet executed in the reception command area 163 is read out and is set into the reception DMA control information holding means 117. When there is a designation of the interruption occurrence in the information of the unexecuted reception command in the reception command area 163, it is also set into the interruption control information holding means 113.

Subsequently, as shown in step 840, the reception cell is DMA transferred to the reception packet area 164 on the basis of the information of the reception DMA control information holding means 117.

As shown in step 845, a check is made to see if the reception cell conforms to the packet format or not, namely, whether the reception cell is the packet transfer abnormal end notification cell or not. Further, as shown in step 850, a check is made to see if the reception cell is the final cell of the packet or not. When the reception cell is not the final cell of the packet in step 850, the processing routine is branched to step 840 and the next reception cell is DMA transferred. When the reception cell conforms to the packet format and the reception cell is the final cell of the packet, or in the case where the reception cell doesn't conform to the packet format in step 845, the processing routine is branched to step 860.

In step 860, since the process of the packet reception in response to the reception command has been completed, a reception DMA end state is written into the reception command area 163. That is, when the processing routine is branched from step 845, a fault end report is written. When the processing routine is branched from step 850, a normal end report is written. Further, an interruption is issued to the processor 130 in accordance with the contents of the interruption control information holding means 113. To prepare for execution of the next reception command, the information in the reception command control information holding means 112 is updated.

In step 830, when there is no unexecuted reception command in the reception command area 163, the processing routine is branched to step 865. In step 865, when there is no reception packet abandonment instruction information, step 830 follows. When there is a reception notification, step 870 follows.

In step 870, the reception cell is read out from the buffer 122 for reception. Subsequently, as shown in step 880, the reception cell in the buffer 122 for reception is abandoned. This is because in the case where there is no unreceived command in the reception command area 163, it is necessary to avoid a situation such that the reception software pre-process is activated and the network adapter receiving operation is stopped for a period of time until the unreceived command is supplied, and the packet transfer is stopped on the packet transfer adapter circuit 110 or packet transfer network 190 by the flow control to turn off the transmission permission signal 214-$m$, so that the whole communication is blocked. The reception packet abandonment instruction information is set into the adapter control information holding means 114 by the software or is instructed to the adapter control means 115.

Before the receiving operation is started by the notification of the activation of the operation to the adapter control means 115, the reception packet is abandoned by a flow similar to steps 870 and 880 or by fixedly turning on the transmission permission line 214-$m$. When the group of computers connected are cooperatively operating in the parallel mode, it is desirable not to abandon the reception packet because the abandonment of the reception packet exerts a serious influence. When the group of computers connected are operating in the distributing mode in which each computer performs an own job, even if the reception packet is abandoned, a retransmitting process can be relatively easily executed.

The reception software post-process that is executed after the arrival of the data will now be described. The reception software post-process is activated by the interruption issued by the network packet via the hardware. Such an interruption is issued after the data was divided to the user data and reception protocol information and they were transferred.

First, when the interruption is issued, the processor 130 processes the reception command of the reception completion of the reception command area 163 in accordance with an end state, which will be explained hereinafter. That is, in case of the normal end state, the reception command is transferred to the user data area R. In case of the abnormal end state, fault log information is preserved and the retransmitting process is executed.

Another embodiment of the inter-PE communication packet will now be described with reference to FIG. 3B. The data packet that is communicated through the network is constructed by data 310-$b$, a type 320-$b$, source address 321-$b$, a destination address 322-$b$, and reception packet abandonment instruction information 312-$b$. The data 310-$b$ is information which is processed by the OS and the software. The type 320-$b$ is information that is necessary for the packet transfer adapter circuit 110 to process and holds, for example, a length of whole data and the like. The source address 321-$b$ is an identifier to identify the intra-network computer 200 which transmitted the packet. The destination address 322-$b$ is an identifier to identify the intra-network computer 200 which should receive the packet. The reception packet abandonment instruction information 312-$b$ is information indicating whether the DMA control unit of the network adapter 110 on the reception side executes the reception and abandonment or inhibits the reception and abandonment in step 865 when no command regarding the unreception remains in the area 163. When the inhibition of the reception and abandonment is designated, namely, if NO in step 865, step 830 follows and the apparatus waits for the reception until there is the reception command. In case of executing the parallel processes, the reception packet abandonment instruction information 312-$b$ is turned off. In case of performing the distributed processes, the reception packet abandonment instruction information 312-$b$ is turned on. Thus, the flow control suitable for the processes can be realized.

Figure 3B:
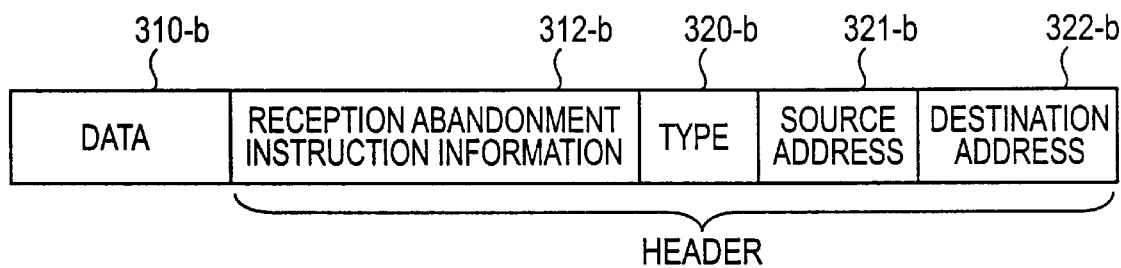
Figure 3C:
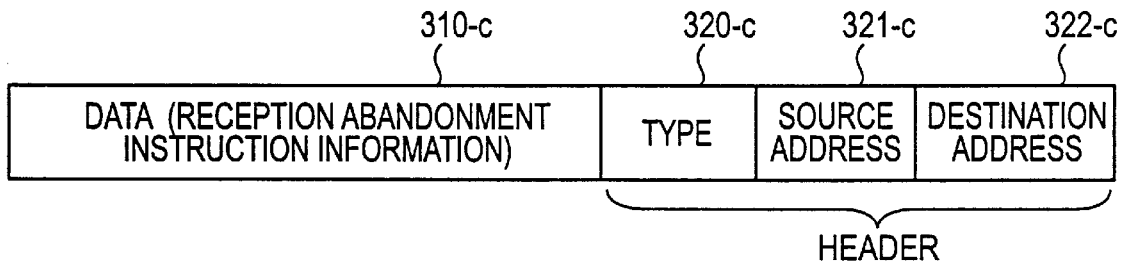
Figure 9:
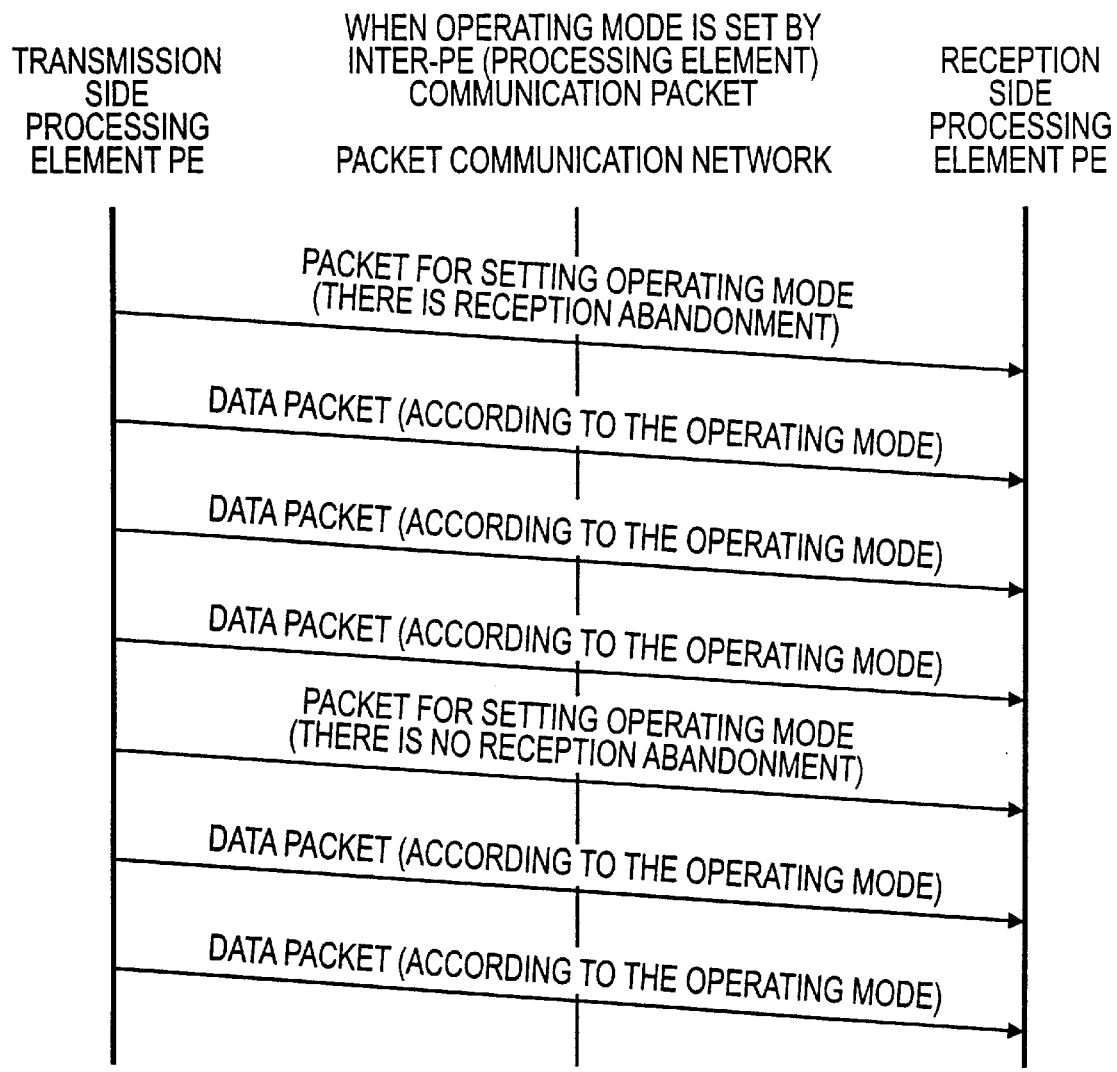
FIG. 9 is a diagram showing packets of setting operation modes.

FIG. 3C shows another embodiment in which the operating mode is set by the inter-PE communication packet. A network packet of FIG. 3C is constructed by data 310-$c$, a type 320-$c$, a source address 321-$c$, and a destination address 322-$c$ by a format similar to that shown in FIG. 3A. As shown in FIG. 9, the packet is communicated between the computer elements of transmission and reception as a pre-process to start the data communication. The type 320-c is information necessary for the packet transfer adapter circuit 110 to process and holds, for example, a length of whole data and the like. The type 320-c also has information indicative of the packet to set the operating mode information into the adapter control information holding means 114. When the type 320-c indicates the packets to set the operating mode information into the adapter control information holding means 114, as operating mode information to be set into the adapter control information holding means 114, the data 310-c has the operating mode information indicating whether, for example, the reception area in the memory lacks or the packet is abandoned in the unreceivable state due to some other reasons.

When the packet is received, the intra-network computer 200 on the reception side sets the operating mode information into the adapter control information holding means 114, for example, a register. The operation of the intra-network computer 200 on the reception side for each data packet that is received after that is executed in the operating mode set as shown in FIG. 9.

It will be understood that the embodiment is preferable in terms of a point that the number of burying times is reduced as compared with the embodiment in which the reception abandonment information is buried into each of the data packets as described in FIG. 3B. In a multi-computer system, each computer can select either one of the distributing mode to execute individual jobs and the mode to execute the parallel processes which are concerned with each other. In the parallel processing mode, the data abandonment in one computer is accompanied with the interruption and reprocess of the parallel processes in the other computers. By executing the mode setting in the pre-process prior to the data communication shown in FIG. 3C, there is no need to set the abandonment instruction information into all of the data packets. In the case where the distributed processing mode and the parallel processing modes are alternately executed, it will be understood that such a system is, particularly, an effective data communication control system.

In another embodiment of issuing the packet shown in FIG. 3C, it is possible to provide a system management means in a PE-j of the computer system 10, the terminal 30, or the WS 40, thereby managing communication mode setting among the PEs.

In this case, the instruction information 310C shown in FIG. 3C further includes information designating a transmission and a reception PEs.

Figure 10:
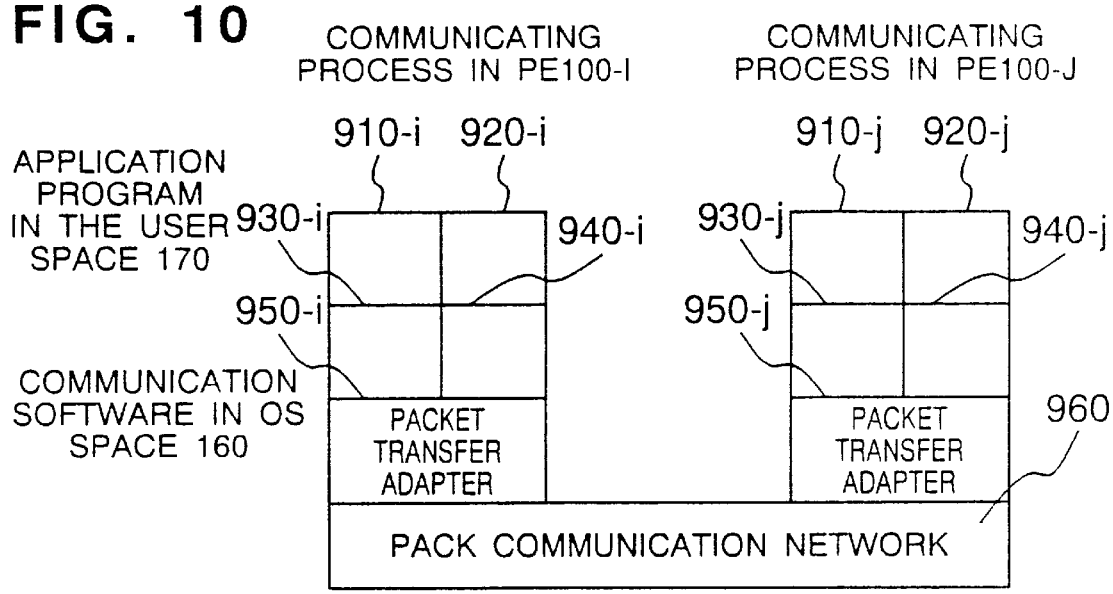
FIG. 10 is a diagram showing a function hierarchy of a communicating process.

FIG. 10 shows a functional hierarchy of the communicating process. The functional hierarchy is constructed by application programs 910-i, 910-j, 920-i, and 920-j in the user space 170, communication softwares 930-i, 930-j, 940-i, and 940-j in the OS space 160, packet transfer adapters 950-i and 950-j, and a packet communication network 960. The application programs 910-i and 910-j communicate the packet in the mode for abandoning the packet and activate the communication softwares 930-i and 930-j. The application programs 920-i and 920-j communicate the packet in the mode for abandoning no packet and activate the communication softwares 940-i and 940-j. The case of transferring the packet from the PE 100-i to the PE 100-j will now be described.

The communication software 930-i instructs the transfer of the communication packet shown in FIG. 3B to the packet transfer adapter 950-i. The packet transfer adapter 950-j which received the packet via the packet communication network 960 activates the communication software 930-j on the basis of the format of the communication packet and gives the packet data to the application program 910-j. Since the communication packet set in the abandoning mode shown in FIG. 3B is transferred, when the packet transfer adapter 950-j detects the lacking state of the reception command area 163, the reception packet is abandoned.

After the conditions to turn off the abandoning mode was set into the communication packet shown in FIG. 3B, the communication software 940-i instructs the transfer to the packet transfer adapter 950-i. The packet transfer adapter 950-j which received the packet via the packet communication network 960 activates the communication software 940-j on the basis of the format of the communication packet and gives the packet data to the application program 920-j. Since the communication packet which was set so as not to abandon the data as shown in FIG. 3B is transferred, even when the packet transfer adapter 950-j detects the lacking state of the reception command area 163, no reception packet is abandoned. The reception command is set for the data and the resultant data is inputted to the reception area.

As mentioned above, which one of the plurality of communication softwares can be decided on the basis of the format information of the packet.

Figure 11:
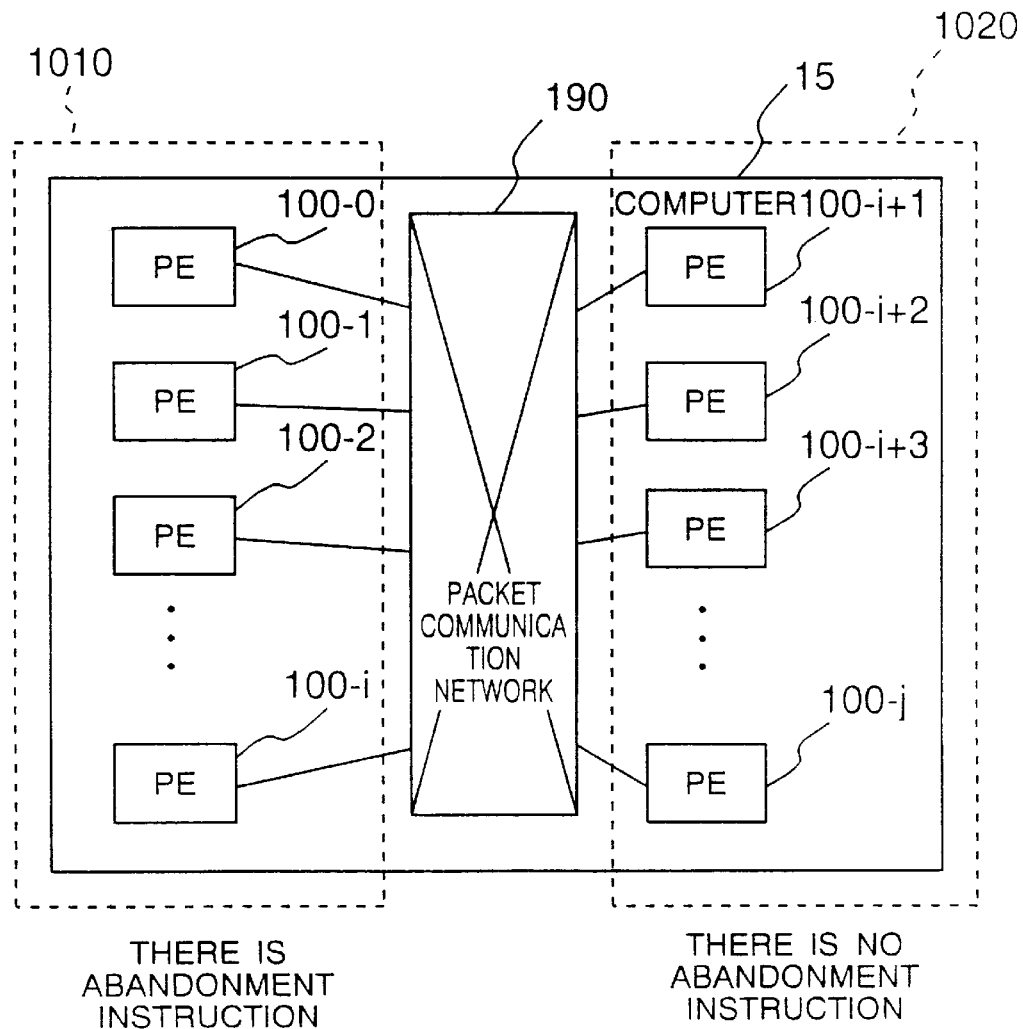
FIG. 11 is a connection constructional diagram showing an example of a connection state in a computer system.

FIG. 11 shows an example of an operation situation of the computer of the invention. In FIG. 11, the PEs 100-0, . . . , 100-i, . . . 100-j in a parallel computer 15 are divided to a portion 1010 in which the application programs 910-i and 910-j in FIG. 10 operate and a portion 1020 in which the application programs 920-i and 920-j in FIG. 10 operate and are separately operated with respect to those two portions. The PEs can be also further finely divided and operated. The portions 1010 and 1020 can also overlap.

According to another embodiment of the invention, when the network is used as a network for parallel processes, the computer operates so as not to abandon the packet. However, as means for relieving in the case where it is detected that the network is hung up due to a serious cause such as occurrence of a dead lock or the like, a network which can be changed to an operating mode to abandon the packet can be provided.

Figure 12:
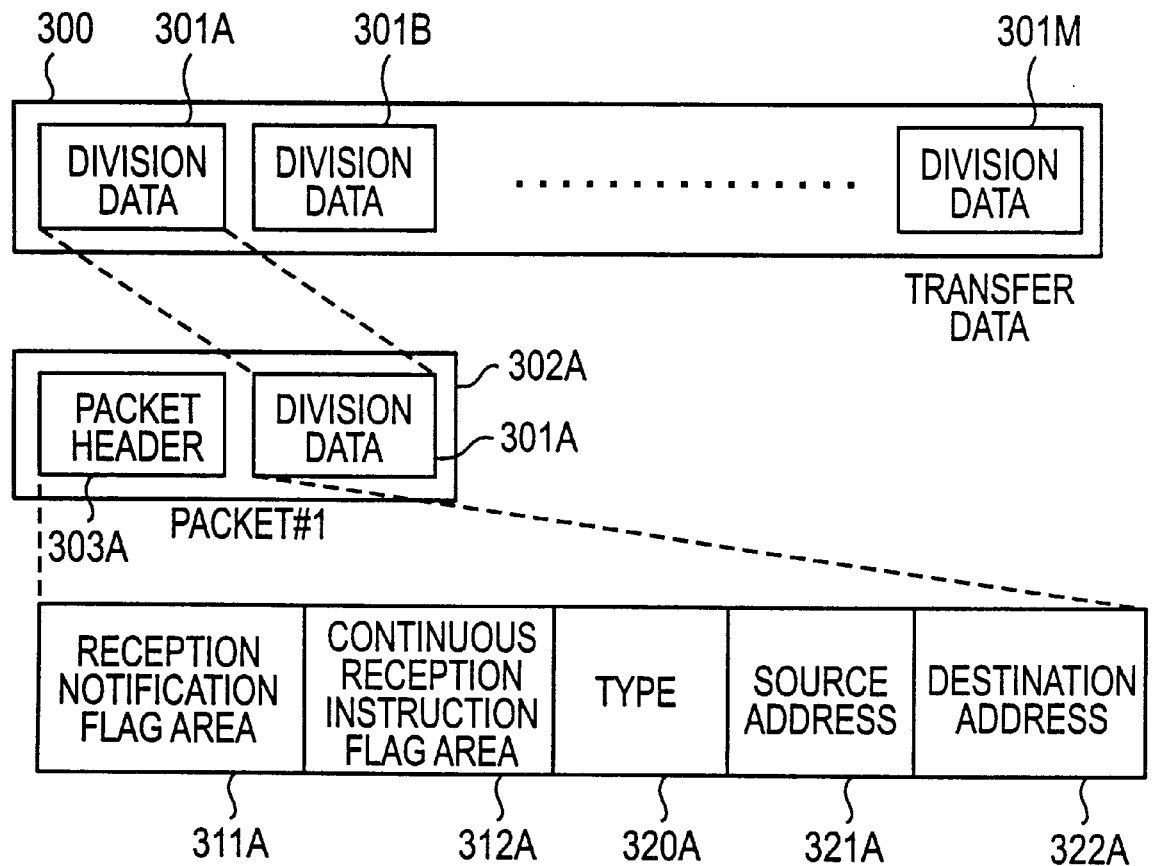
FIG. 12 is a conceptual diagram showing a communication packet construction.

An embodiment of the inter-PE communication packet will now be explained with reference to FIG. 12. FIG. 12 is an explanatory diagram showing a structure of data 300 which is transferred through the packet communication network 190 of the parallel computer 10.

The transfer data 300 is first divided into division data 301A to 301M of a predetermined data length and is formed in a packet 302A in which a packet header 303A is added to the head. The dividing process and the packet forming process are executed by the processor 130. In this instance, those data is held in the main memory 150. The packet header 303 is constructed by a reception notification flag area 311, continuous reception instruction information 312, a type 320, a source address 321, and a destination address 322. The type 320 is information necessary for the packet transfer adapter circuit 110 to process and holds, for example, a length of whole data and the like. The source address 321 is an identifier to identify the intra-network computer 200 which transmitted the packet. The destination address 322 is an identifier to identify the intra-network computer 200 which should receive the packet and a transmission destination program. The continuous reception instruction information 312 is information indicating whether the inter-PE transmitting/receiving circuit 220-m on the transmission side instructs the disconnection to the switch connection request signal 248-m upon completion of the packet transfer or not in step 630 in FIG. 15, which will be explained hereinlater.

In a continuous transfer mode, the reception notification flag area 311 is set in only a packet 302M having the last division data 301M in the transfer data 300 and is not set in the packet having the other division data. The continuous reception instruction information 312 is set in the packet other than the packet 302M to store the last division data 301M in the transfer data 300 and is not set in the packet 302M.

As will be explained hereinlater, consequently, in the reception side process, it is possible to judge such that only when the packet 302M in which the last division data 301M in the transfer data 300 was stored is received, it is necessary to notify the arrival of the data to the reception program. Therefore, when the packet in which the other division data was stored is received, the arrival of the data is not notified. A deterioration of a processing efficiency of the computer 10 which is caused by the notifying process can be reduced.

In the case where the continuous transfer mode is not used, the reception notification flag area 311 is set for all of the packets 302A to 302M. The continuous reception instruction information 312 is not set for all of the packets 302A to 302M.

When the packet 301 is formed, it is sequentially transmitted to the packet communication network 190 via the packet transfer adapter 110.

Steps different from the steps shown in FIGS. 4 and 5 in the transmitting process and receiving process shown in FIGS. 13 and 14 will now be explained hereinbelow.

Figure 13:
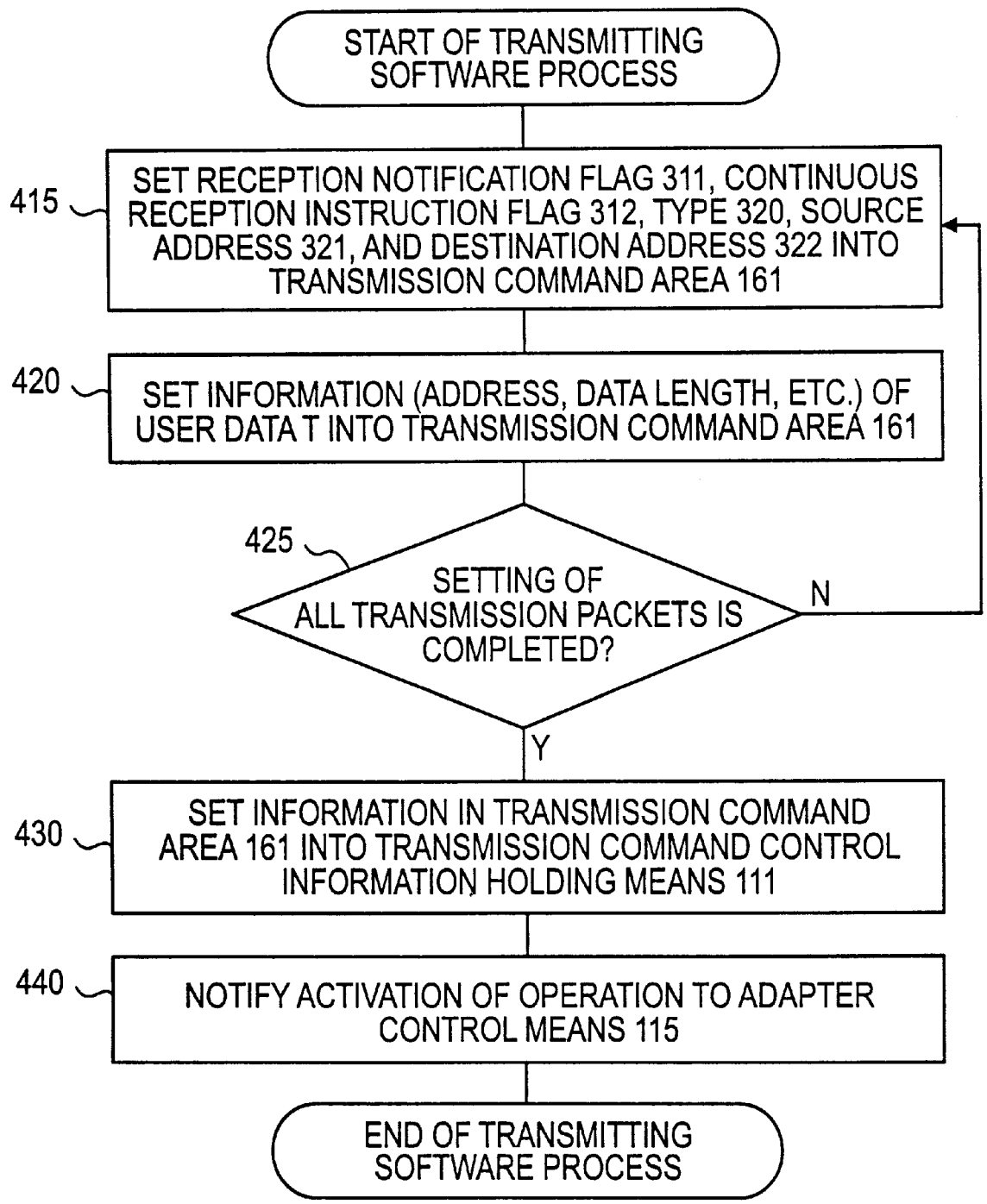
FIG. 13 is a flowchart for a transmission software process.
Figure 14:
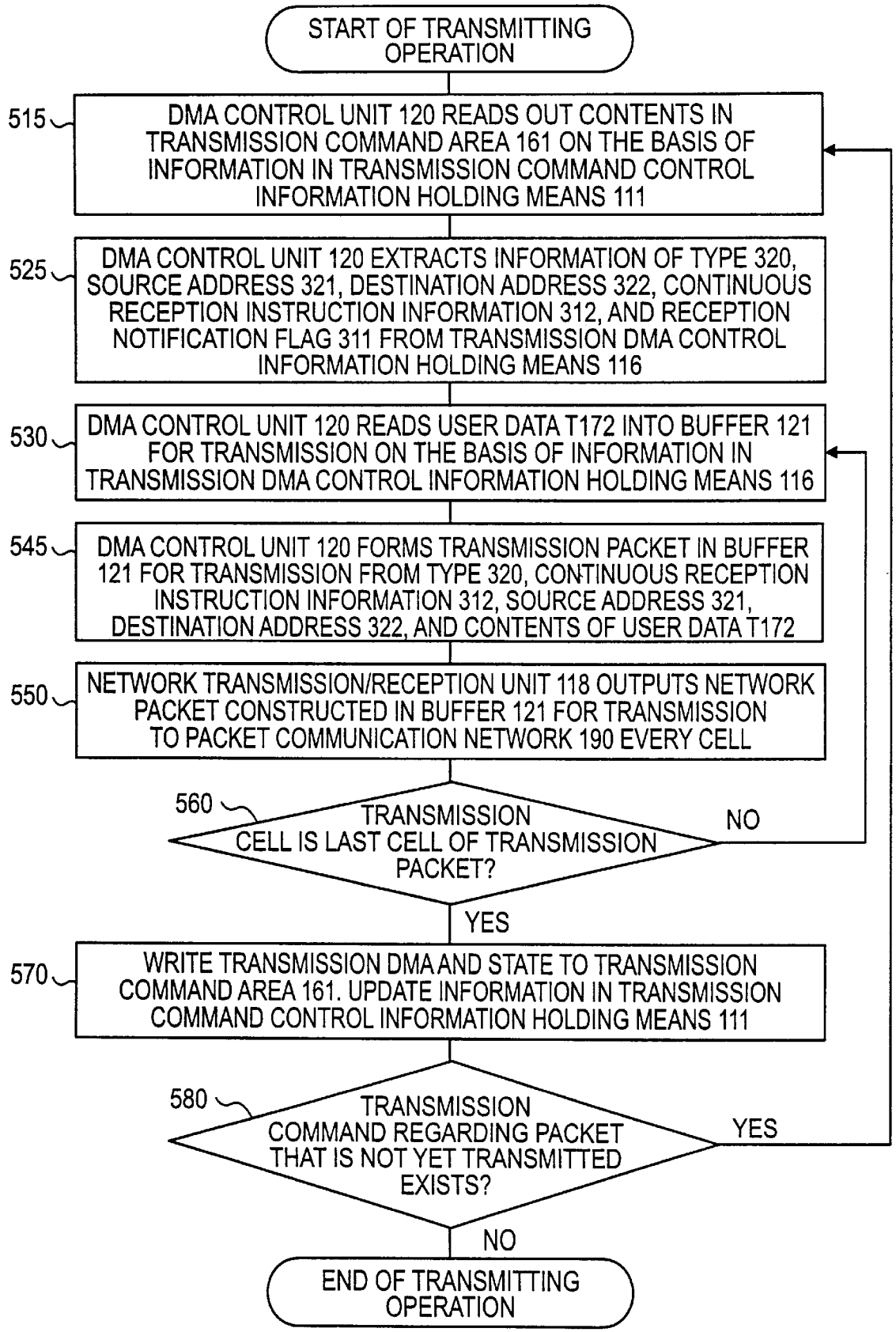
FIG. 14 is a flowchart for a network adapter transmitting process.

Re-explanation of the blocks which have already been described in the flowcharts of FIGS. 13 and 14 are omitted here.

The user data as a target of transmission is held in the user data T 172. First as shown in step 415, information as bases of the continuous reception instruction information 312, reception notification flag 311, type 320, source address 321, and destination address 322 is set in the transmission command information 161.

As shown in steps 420, 425, 430, and 440, subsequently, the transmitting software process is executed.

In the operation of the network adapter 110 at the time of the transmitting process, the steps different from those in FIG. 5 will be explained in accordance with FIG. 14. The operation after the start of the transmitting operation by the activation notification of the operation to the adapter control means 115 will now be described.

First as shown in step 515, the DMA control unit 120 reads out the contents in the transmission command area 161 on the basis of the information in the transmission command control information holding means 111 and sets into the transmission DMA control information holding means 116.

As shown in step 525, the DMA control unit 120 extracts the type 320, continuous reception instruction information 312, reception notification flag 311, source address 321, and destination address 322 from the contents in the transmission DMA control information holding means 116.

After step 530 was executed, as shown in step 545, the DMA control unit 120 sets the user data T 172 to the data 310 and forms the network packet of the invention into the buffer 121 for transmission on a cell unit basis from the information (type 320, continuous reception instruction information 312, reception notification flag 311, source address 321, and destination address 322) in the transmission command area 161 which was read out.

Steps 550, 560, 570, and 580 are subsequently executed.

Figure 15:
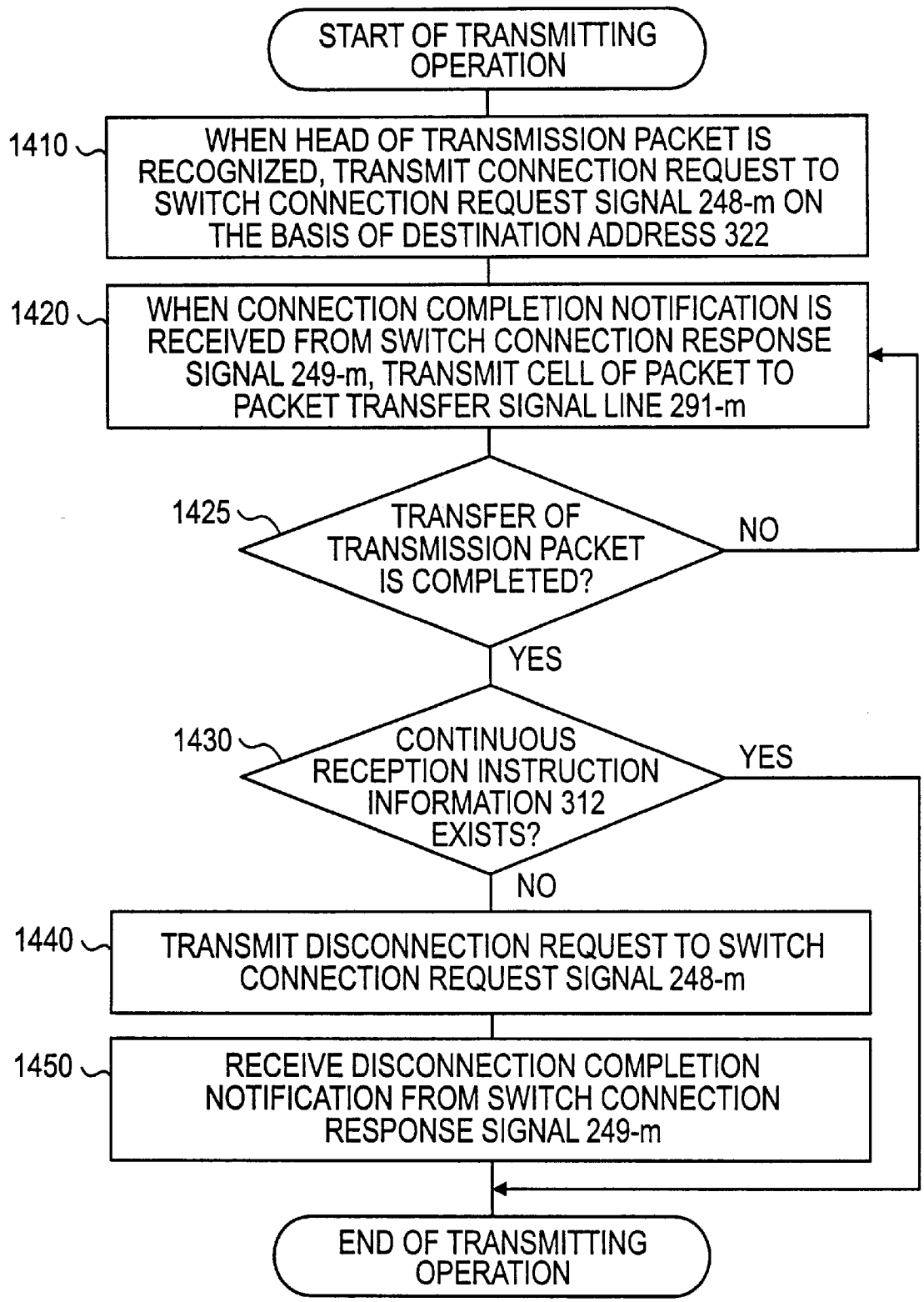
FIG. 15 is a flowchart for a transmitting process of an inter-PE transmitting and receiving circuit on the transmission side of a packet communication network.

The transmitting operation of the inter-PE transmitting/ receiving circuit 220-m of the packet communication network 190 at the time of the transmitting process will now be described with reference to FIG. 15.

First as shown in step 1410, when the head of the transmission packet is recognized, the connection request for the switch control circuit 250 is transmitted to the switch connection request signal 248-m on the basis of the destination address 322.

As shown in step 1420, when a connection completion notification from the switch control circuit 250 is received via the switch connection response signal 249-m, the cell transmission of the packet to the crossbar switch circuit 240 is started to the packet transfer signal line 291-m.

As shown in step 1425, step 1420 is executed until the completion of the transfer of all of the transmission packets. After completion of the transfer, the processing routine is branched to step 1430.

As shown in step 1430, when an instruction of the continuous reception instruction information 312 doesn't exist as control information of the packet, the processing routine is branched to step 1440. When such an instruction exists, the transmitting operation is completed.

In step 1440, a disconnection request for the switch control circuit 250 is transmitted to the switch connection request signal 248-m.

As shown in step 1450, when a disconnection completion notification from the switch control circuit 250 is received from the switch connection response signal 249-m, the transmitting operation is completed.

In the case where there is the continuous reception instruction information 312, the next packet is transmitted to the same PE as the previous packet and there is no need to switch the crossbar switch circuit 240. In FIG. 15, although the switch control circuit 250 doesn't disconnect the crossbar switch circuit 240, as for the transmission of the next packet as shown in step 1410, the connection request to the switch control circuit 250 is again transmitted to the switch connection request signal 248-m on the basis of the destination address 322. As another embodiment, when there is the continuous reception instruction information 312 in the previous packet, in step 1410, it is also possible to perform a process not to transmit the switch connection request signal 248-m.

Figure 16:
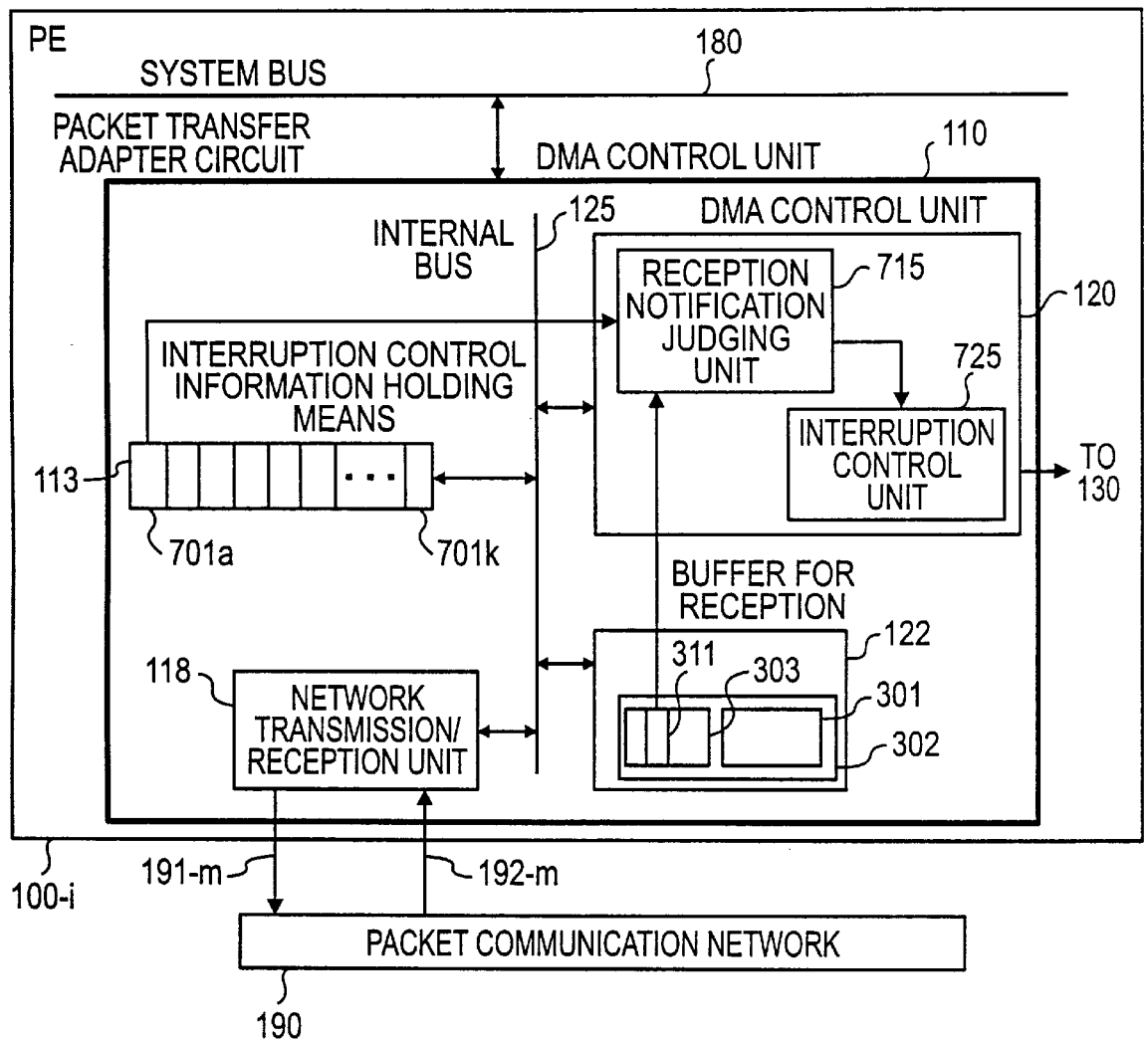
FIG. 16 is a constructional block diagram of an interruption control logic.

FIG. 16 shows an interruption control logic in the packet transfer adapter circuit 110.

The packet transfer adapter circuit 110 is constructed by the buffer 122 for reception to store a received packet 302, DMA control unit 120, and interruption control information holding means 113 such as an interruption mask. The interruption control information holding means 113 is an area to store a status flag of the program by an instruction from the processor 130 and is constructed by a plurality of program status flags 701A to 701K. Each flag indicates whether the program that is being executed in the computer 100 on the reception side is in a communication data reception waiting state or not. The DMA control unit 120 has not only a function for controlling the process to transfer the packet 302 stored in the reception buffer 122 to the main memory 150 through the system bus 180 but also a reception notification judging unit 715 and an interruption control unit 725.

When the packet 302 is stored in the reception buffer 122, the reception notification judging unit 715 activates the interruption control unit 725 in the case where it is judged that it is necessary to notify the reception to the program by referring to the reception notification flag area 311 and interruption control information holding means 113.

Figure 17:
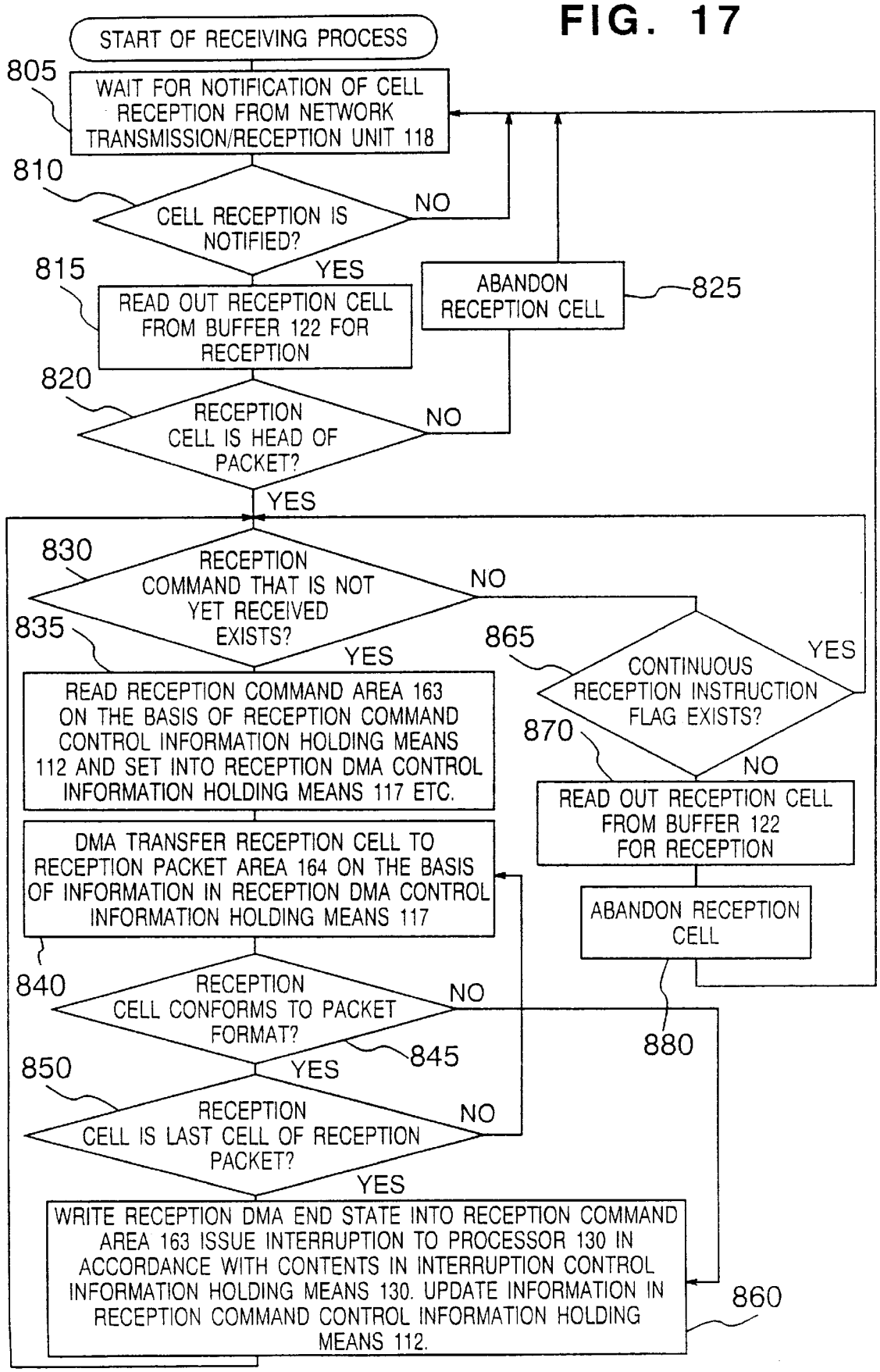
FIG. 17 is a flowchart for a receiving operation of a network adapter DMA control unit.

FIG. 17 shows the operation of the network adapter 110 until the data is received after the network packet was taken in. A flow after the start of the receiving operation by the activation notification of the operation to the adapter control means 115 is shown. In a manner similar to FIG. 8, FIG. 16 mainly shows the DMA control unit 120.

After steps 805 to 830 were executed, when the reception command that is not executed yet doesn't exist in the reception command area 163, the processing routine is branched to step 865. When there is the continuous reception instruction flag in step 865, the processing routine is branched to step 830. When there is no continuous reception instruction flag, the processing routine is branched to step 870. Steps 870 and 880 are similar to the operations in FIG. 8.

Figure 18:
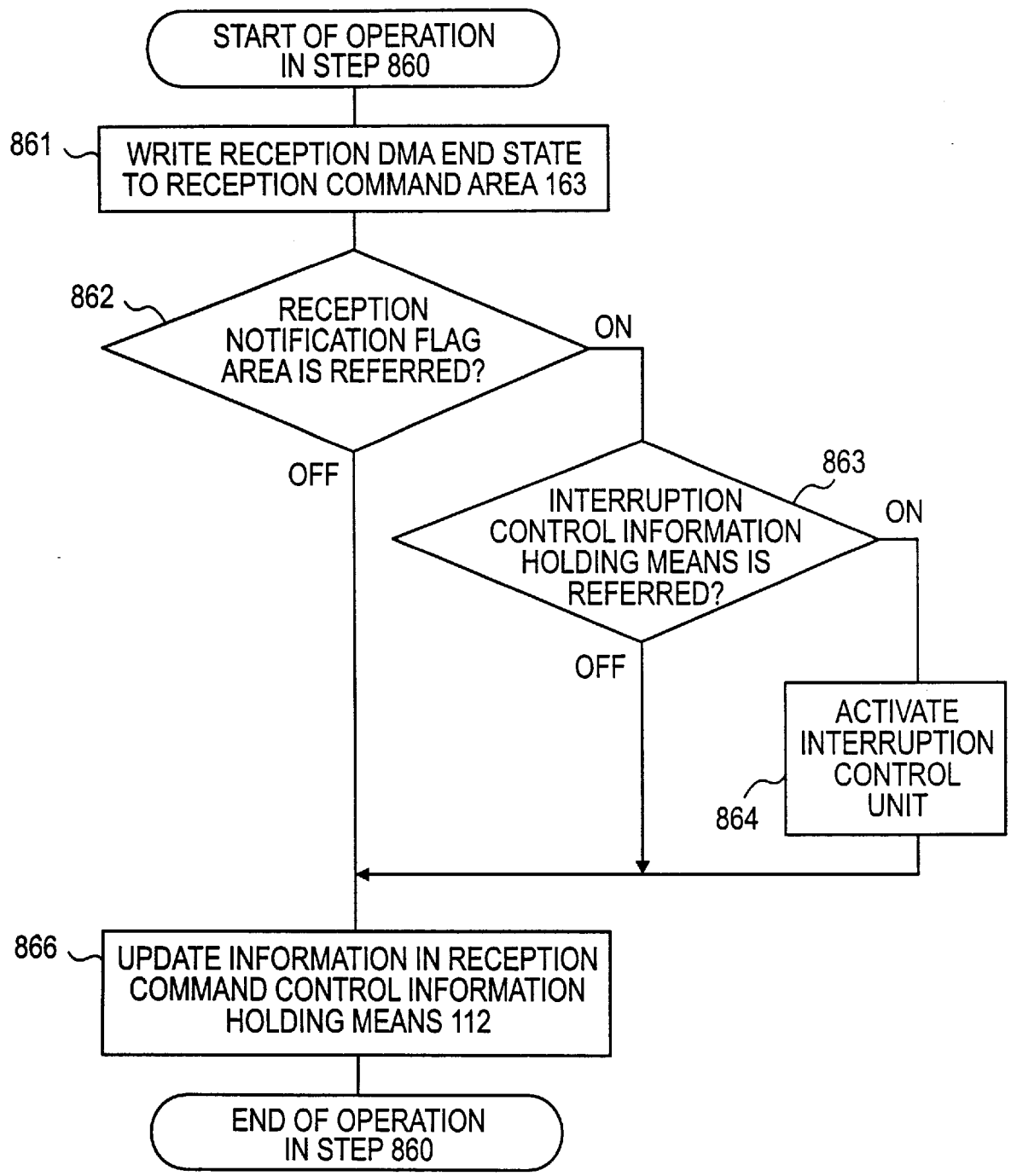
FIG. 18 is a block conceptual diagram showing an example of a connection state in the computer system.

The operation in step 860 is shown in FIG. 18.

In step 861, a reception DMA end state is written into the reception command area 163.

When the reception notification flag area 311 is set, step 863 follows. The transmission destination program is found out on the basis of the source address 321 and the state of the corresponding program is referred from the interruption control information holding means 113.

When the interruption control information holding means 113 is not set, namely, when the transmission destination program is not in the reception waiting state, step 866 follows. An updating process of the information in the reception command control information holding means 112 is activated.

When the interruption control information holding means 113 has been set, the interruption control unit 720 is activated and the reception notifying process for the transmission designation program is activated and the processing routine advances to step 866. An updating process of the information in the reception command control information holding means 112 is activated.

After execution of step 866, the processing routine is returned to step 830 because of the end of operation of step 860 and the next reception command is again read.

A functional hierarchy of the communicating process will now be described by commonly using FIG. 10. The functional hierarchy is constructed by the application programs 910-i, 910-j, 920-i, and 920-j in the user space 170, communication softwares 930-i, 930-j, 940-i, and 940-j in the OS space 160, packet transfer adapters 950-i and 950-j, and packet communication network 960. The application programs 910-i and 910-j communicate the packet by the packet with a continuous transfer instruction and activate the communication softwares 930-i and 930-j. The application programs 920-i and 920-j communicate the packet by the packet without a continuous transfer instruction and activate the communication softwares 940-i and 940-j. A case of transferring the packet from the PE 100-i to the PE 100-j will now be described.

The communication software 930-i instructs the transfer of the packet with the continuous transfer instruction to the packet transfer adapter 950-i and continuously transfers the packet via the packet communication network 960. The packet transfer adapter 950-j activates the communication software 930-j on the basis of the reception notification instruction from the last packet 302N and gives the packet data to the application program 910-j.

The communication software 940-i instructs the transfer of the packet without the continuous transfer instruction to the packet transfer adapter 950-i and multiplexes the packet with the packet from the other source and transfers the multiplexed packet via the packet communication network 960. On the basis of the reception notification instruction from each of the packets 302A to 302N, the packet transfer adapter 950-j activates the communication software 930-j and gives the packet data to the application program 910-j.

As mentioned above, which one of a plurality of communication softwares is activated can be decided on the basis of the format information of the packet.

Figure 19:
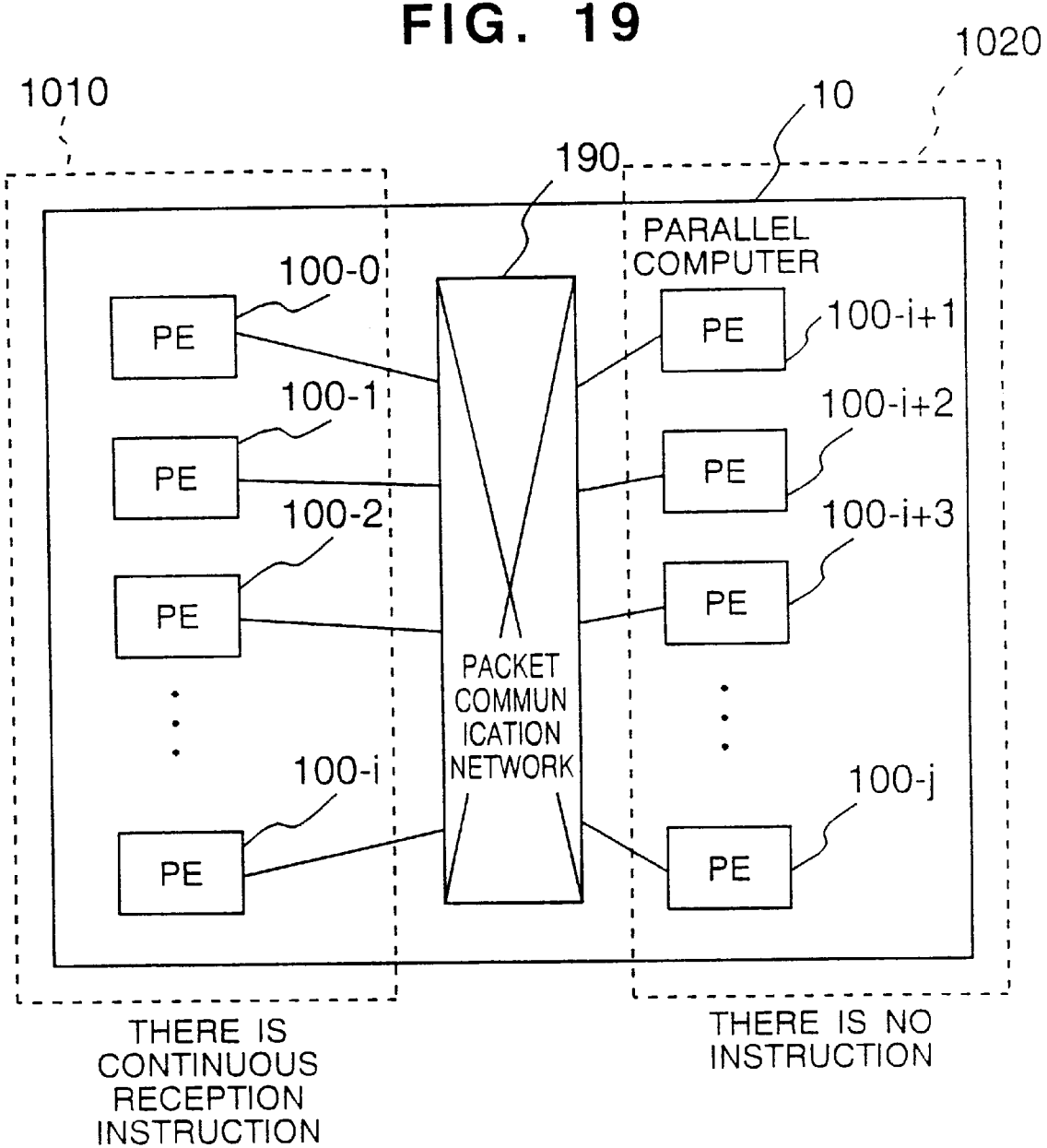
FIG. 19 is a flowchart for the receiving operation of the network adapter DMA control unit.

FIG. 19 shows an example of an operation situation of the parallel computer of the invention. In FIG. 19, the PEs 100-0, . . . , 100-i, . . . , 100-j in the parallel computer 10 are divided into the portion 1010 in which the application programs 910-i and 910-j in FIG. 9 operate and the portion 1020 in which the application programs 920-i and 920-j in FIG. 9 operate and are separately operated with respect to those two portions. Further, they can be also finely divided and operated. Or, the portions 1010 and 1020 can also overlap.

According to the above embodiments, by designating the continuous reception instruction flag into a control field of the transmission packet in accordance with the size of transmission message by the communication software of the computer on the transmission side, the computer system on the reception side can receive a message exceeding the packet length from the same source as a continuous packet. Thus, since the process to rearrange the order is not activated in the communication software, there is an excellent effect such that the overhead of the communication software can be reduced.

What is claimed is:

1. A computer system in which a plurality of computers transmit data to each other through a mutual connection network, comprising:

one of said plurality of computers including a setting component for setting path information indicating whether to connect or disconnect a path of said mutual connection network in data to be transmitted from a computer of said plurality of computers; and said connection network including a determining component for determining whether to connect or disconnect said path in response to contents of said path information.

2. A computer system according to claim 1, wherein another computer of said plurality of computers receiving data from said transmitting computer determine not to abandon said transmitted data even in a case not prepared with a memory area for receiving data during a time period of receiving said transmitted data including said path information indicating to disconnect said path.

3. A computer system according to claim 2, further comprising a flow controller for informing that said network is under a state capable of receiving data to prevent loss of transmission data to said plurality of computers wherein said mutual connection network includes a crossbar switch circuit.

4. A computer system according to claim 2, wherein a communication program indicated by an application program of said transmitting computer determines whether to transmit said data including said path information to a group of computers.

5. A computer system according to claim 2, wherein a communication program provided in said transmitting computer divides said transmitted data into a plurality of data segments and inserts said path information into last segment of said plurality of data segments by use of said setting component.

6. A computer system according to claim 2, wherein a communication program provided in said transmitting computer inserts said path information into one of a group of data segments of a data to be sent to a computer.

7. A computer included in a computer system for transmitting data to each other through a mutual connection network, comprising:

a setting component for setting path information indicating whether to connect or disconnect a path of said mutual connection network in data to be transmitted; and a transmitting component for transmitting said data to said mutual connection network.

8. A computer included in a computer system for receiving data through a mutual connection network, comprising:

a data receiving component;

a determining component for determining whether to connect or disconnect a path used in response to contents of path information included in received data; and a buffer controller for determining not to abandon said received data even in a case not prepared with a memory area for receiving data during a time period of receiving said transmitted data including said path information indicating to disconnect said path.

9. A communication control method for transmitting data in a computer included in a computer system for transmitting data through a mutual connection network, comprising the steps of:

setting path information indicating whether to connect or disconnect a path of said mutual connection network in data to be transmitted; and transmitting said data to said mutual connection network.

10. A communication control method for receiving data through a mutual connection network, comprising:

receiving data from said mutual connection network;

determining whether to connect or disconnect a path used in response to contents of path information included in received data; and determining not to abandon said received data even in a case not prepared with a memory area for receiving data during a time period of receiving said received data including said path information indicating to disconnect said path.

* * * * *